United States Patent
Xu et al.

(10) Patent No.: US 11,533,507 B2
(45) Date of Patent: Dec. 20, 2022

(54) MAPPING RESTRICTION FOR INTRA-BLOCK COPY VIRTUAL BUFFER

(71) Applicants: Beijing Bytedance Network Technology Co., Ltd., Beijing (CN); Bytedance Inc., Los Angeles, CA (US)

(72) Inventors: Jizheng Xu, San Diego, CA (US); Li Zhang, San Diego, CA (US); Kai Zhang, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/582,447

(22) Filed: Jan. 24, 2022

(65) Prior Publication Data

US 2022/0150540 A1    May 12, 2022

Related U.S. Application Data

(63) Continuation of application No. PCT/CN2020/104084, filed on Jul. 24, 2020.

(30) Foreign Application Priority Data

Jul. 25, 2019  (WO) ................ PCT/CN2019/097742
Oct. 7, 2019   (WO) ................ PCT/CN2019/109849
Dec. 3, 2019   (WO) ................ PCT/CN2019/122606

(51) Int. Cl.
*H04N 19/176* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 9,860,559 B2   1/2018  Zhang et al.
9,877,043 B2   1/2018  He et al.
(Continued)

FOREIGN PATENT DOCUMENTS

CN   105847795 A   8/2016
CN   106797466 A   5/2017
(Continued)

OTHER PUBLICATIONS

Xu et al.,JointVideo Experts Team (JVET) of ITU-T SG 16 WP 3 and ISO/IEC JTC 1/SC 29/WG 11 15th Meeting: Gothenburg, SE, Jul. 3-12, 2019 Document: JVET-O1170-v1 (Year: 2019).*
(Continued)

*Primary Examiner* — Alison Slater
(74) *Attorney, Agent, or Firm* — Perkins Coie LLP

(57) ABSTRACT

A method for video processing includes determining, for a conversion between a current video block of a video picture of a video and a bitstream of the video, a number of reference samples in a virtual buffer comprising reference samples derived from the video picture based on a rule, wherein the rule specifies that a maximum number of available reference samples in the virtual buffer is less than a size of the virtual buffer; and performing the conversion based on the determining, wherein the current video block is coded in a prediction mode in which prediction samples are (Continued)

derived from blocks of the available reference samples in the virtual buffer based on a block vector.

18 Claims, 13 Drawing Sheets

(51) Int. Cl.
*H04N 19/423* (2014.01)
*H04N 19/593* (2014.01)
*H04N 19/11* (2014.01)
*H04N 19/132* (2014.01)
*H04N 19/172* (2014.01)
*H04N 19/186* (2014.01)

(52) U.S. Cl.
CPC ......... *H04N 19/132* (2014.11); *H04N 19/172* (2014.11); *H04N 19/176* (2014.11); *H04N 19/186* (2014.11); *H04N 19/423* (2014.11)

(56) References Cited

U.S. PATENT DOCUMENTS

| | | | |
|---|---|---|---|
| 10,178,403 | B2 | 1/2019 | Seregin et al. |
| 10,284,874 | B2 | 5/2019 | He et al. |
| 10,412,387 | B2 | 9/2019 | Pang et al. |
| 10,516,882 | B2 | 12/2019 | He et al. |
| 10,582,213 | B2 | 3/2020 | Li et al. |
| 2015/0264396 | A1 | 9/2015 | Zhang et al. |
| 2016/0255344 | A1 | 9/2016 | Lee et al. |
| 2017/0150176 | A1 | 5/2017 | Zhang et al. |
| 2017/0230685 | A1 | 8/2017 | Gisquet et al. |
| 2017/0289566 | A1 | 10/2017 | He et al. |
| 2017/0295379 | A1 | 10/2017 | Sun et al. |
| 2017/0347093 | A1 | 11/2017 | Yu et al. |
| 2018/0091825 | A1 | 3/2018 | Zhao et al. |
| 2018/0098079 | A1 | 4/2018 | Chuang et al. |
| 2018/0146191 | A1 | 5/2018 | Jiang et al. |
| 2019/0200038 | A1 | 6/2019 | He et al. |
| 2019/0208217 | A1 | 7/2019 | Zhou et al. |
| 2019/0238849 | A1 | 8/2019 | Fang et al. |
| 2019/0246143 | A1 | 8/2019 | Zhang et al. |
| 2020/0077087 | A1 | 3/2020 | He et al. |
| 2020/0396465 | A1 | 12/2020 | Zhang et al. |
| 2020/0404255 | A1 | 12/2020 | Zhang et al. |
| 2020/0404260 | A1 | 12/2020 | Zhang et al. |
| 2020/0413048 | A1 | 12/2020 | Zhang et al. |
| 2021/0014504 | A1 | 1/2021 | Xu et al. |
| 2021/0112243 | A1 | 4/2021 | Xu et al. |
| 2021/0152833 | A1 | 5/2021 | Gao et al. |
| 2021/0314560 | A1 | 10/2021 | Lai et al. |
| 2021/0400304 | A1* | 12/2021 | Gao ............ H04N 19/184 |
| 2022/0030223 | A1* | 1/2022 | Chen ............ H04N 19/137 |
| 2022/0166998 | A1* | 5/2022 | Lim ............ H04N 19/117 |
| 2022/0182662 | A1* | 6/2022 | Kang ............ H04N 19/11 |

FOREIGN PATENT DOCUMENTS

| | | |
|---|---|---|
| CN | 106797479 A | 5/2017 |
| CN | 107211155 A | 9/2017 |
| CN | 107646195 A | 1/2018 |
| WO | 2019125093 A1 | 6/2019 |

OTHER PUBLICATIONS

Gao et al., Bitstream conformance with a virtual IBC buffer concept, Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-01171-v1 (Year: 2019).*

Brass et al., Versatile Video Coding (Draft 6), Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O2001-vE (Year: 2019).*

Bross et al. "Versatile Video Coding (Draft 3)," oint Video Experts Team (JVET) of ITU-T SG 16 WP 3 and ISO/IEC JTC 1/SC 29/WG 1112th Meeting: Macao, CN, Oct. 3-12, 2018, document JVET-L1001, 2018.

Chang et al. "AHG8: Support for Reference Picture Resampling—Handling of Resampling, TMVP, DMVR, and BDOF," Joint Video Experts Team (JVET) of ITU-T SG 16 WP 3 and ISO/IEC JTC 1/SC 29/WG 11 15th Meeting Gothernburg, SE, Jul. 3-12, 2019, document JVET-O0134, 2019.

Chen et al. "Algorithm Description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2002, 2019.

Lu et al. "CE12: Mapping Functions (test CE12-1 and CE12-2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0427, 2019.

Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0236, 2019.

Xu et al. "CE8: CPR Reference Memory Reuse Without Increasing Memory Requirement (CE8.1.2a and CE8.1.2d)," Joint Video Experts Team (JVET) of ITU-T SG 16 WP 3 and ISO/IEC JTC 1/SC 29/WG 11 13th Meeting: Marrakesh, MA, Jan. 9-18, 2019, document JVET-M0407, 2019.

Xu et al. "CE8: CPR Reference Memory Reuse With Reduced Memory Requirement (CE8.1.2b and CE8.1.2c)," Joint Video Experts Team (JVET) of ITU-T SG 16 WP 3 and ISO/IEC JTC 1/SC 29/WG 11 13th Meeting: Marrakesh, MA, Jan. 9-18, 2019, document JVET-M0408, 2019.

Xu et al. "An Implementation of JVET-00568 Based on the IBC Buffer Design of JVET-O0127," Joint Video Experts Team (JVET of ITU-T SG 16 WP 3 and ISO/IEC JTC 1/SC 29/WG 11 15th Meeting: Gothenburg, SE, Jul. 3-12, 2019, document JVET-O1161, 2019.

International Search Report and Written Opinion from International Patent Application No. PCT/CN2020/104081 dated Oct. 28, 2020 (11 pages).

International Search Report and Written Opinion from International Patent Application No. PCT/CN2020/104084 dated Oct. 28, 2020 (12 pages).

International Search Report and Written Opinion from International Patent Application No. PCT/CN2020/113674 dated Dec. 8, 2020 (9 pages).

International Search Report and Written Opinion from International Patent Application No. PCT/CN2020/116959 dated Dec. 14, 2020 (12 pages).

Non Final Office Action from U.S. Appl. No. 17/582,351 dated Apr. 12, 2022.

Examination Report from Indian Patent Application No. 202227004306 dated Jul. 13, 2022 (6 pages).

Tsang et al. "Reduced-Complexity Intra Block Copy (IntraBC) Mode with Early CU Splitting and Pruning for HEVC Screen Content Coding," IEEE Transactions on Multimedia, Feb. 2019, 21(2):269-283.

Xu et al. "Intra Block Copy in Versatile Video Coding with Reference Sample Memory Reuse," IEE, Picture Coding Symposium, Ningbo China, Nov. 2019.

Non Final Office Action from U.S. Appl. No. 17/702,318 dated Jul. 26, 2022.

Final Office Action from U.S. Appl. No. 17/582,351 dated Aug. 16, 2022.

Gao et al, "CE8-Related: Dedicated IBC Reference Buffer without Bitstream Restrictions," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0248, 2019. (cited in EP20844494.3 EESR mailed Aug. 2, 2022).

Li et al. "CE8-Related: IBC Modifications," Joint Video Experts Team (JVET) of ITU-T SG 16 WP 3 and ISO/IEC JTC 1/SC 29/WG

(56) References Cited

OTHER PUBLICATIONS 11, 15th Meeting, Gothenburg, SE, Jul. 3-12, 2019, document JVET-O0127, 2019. (cited in EP20844494.3 EESR mailed Aug. 2, 2022).

Xu et al. "Intral Block Copy in HEVC Screen Content Coding Extensions," IEEE Journal of Emerging and Selected Topics in Circuits and Systems, Dec. 2016, 6(4):409-419. (cited in EP20844875.3 EESR mailed Aug. 9, 2022).

Xu et al. "Non-CE8: IBC Search Range Increase for Small CTU Size," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0384, 2019. (cited in EP20844875.3 EESR mailed Aug. 9, 2022).

Extended European Search Report from European Patent No. 20844494.3 dated Aug. 2, 2022 (11 pages).

Extended European Search Report from European Patent NO. 20844875.3 dated Aug. 9, 2022 (11 pages).

\* cited by examiner

710 —

712 — Making a decision, based on a size of a virtual buffer associated with a current block that is coded based on pixels in a reference block, regarding a validity of a block vector or one or more samples mapped to the virtual buffer, a current picture comprising the current block and the reference block, and the size of the virtual buffer being based on a size of a virtual pipeline data unit, a size of a coding tree block size or a size of a coding tree unit 714 — Performing, based on the decision, a conversion between the current block and a bitstream representation of the current block

MAPPING RESTRICTION FOR INTRA-BLOCK COPY VIRTUAL BUFFER

CROSS REFERENCE TO RELATED APPLICATIONS

This application is a continuation of International Patent Application No. PCT/CN2020/104084, filed on Jul. 24, 2020, which claims the priority to and benefits of International Patent Application No. PCT/CN2019/097742, filed on Jul. 25, 2019; International Patent Application No. PCT/CN2019/109849, filed on Oct. 7, 2019; and International Patent Application No. PCT/CN2019/122606, filed on Dec. 3, 2019. The entire disclosure of the aforementioned applications is incorporated by reference as part of the disclosure of this application.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to general virtual buffers for intra block copy (IBC). The described methods may be applied to both the existing video coding standards (e.g., High Efficiency Video Coding (HEVC)) and future video coding standards or video codecs.

In one representative aspect, the disclosed technology may be used to provide a method for video processing. This method includes determining, fora conversion between a current video block of a video picture of a video and a coded representation of the video, a number of reference samples in a reference region of the video picture used for predicting the current video block, based on a rule, wherein the rule specifies that the number of reference samples is limited to a certain range; and performing, based on the determining, the conversion.

In another example aspect, a method of video processing is disclosed. The method includes determining, for a conversion between a current video block of a video picture of a video and a coded representation of the video, availability of one or more reference samples of a reference block used for predicting the current video block based on a rule, wherein the rule specifies to use a granularity at a virtual pipeline data unit (VPDU) level in the determining; and performing, based on the determining, a conversion between the current block and a coded representation of the current block.

In yet another aspect, another method of video processing is disclosed. The method includes performing a conversion between a current video block of a video picture of a video and a coded representation of the video according to a rule, wherein the current video block is represented in the coded representation using a residual of prediction from reference samples from a reference region in the video pictures, and wherein the rule specifies that sample values in the reference region are reset at beginning of processing each virtual pipeline data unit (VPDU) during the conversion based on a position of a current VPDU of the current video block.

In yet another aspect, another method of video processing is disclosed. The method includes determining, for a current video block of a video picture of a video and a coded representation of the video, that samples from a current virtual pipeline data unit (VPDU) and three additional recently processed VPDUs in the video picture are available as reference samples for generating a prediction of the current video block due to the current video block having a size larger than a size of 64×64 luma samples; and performing the conversion based on the determining.

In yet another aspect, another method of video processing is disclosed. The method includes performing a conversion between a current video block of a video picture of a video and a coded representation of the video, and wherein, the conversion comprises using, a count of a number of available current virtual pipeline data units (VPDUs) that are mapped to a reference region of the video picture from which one or more reference samples are used for predicting the current video block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 7A, 7B and 7C show flowcharts of example methods for video processing based on some implementations of the disclosed technology.

DETAILED DESCRIPTION

Figure 1:
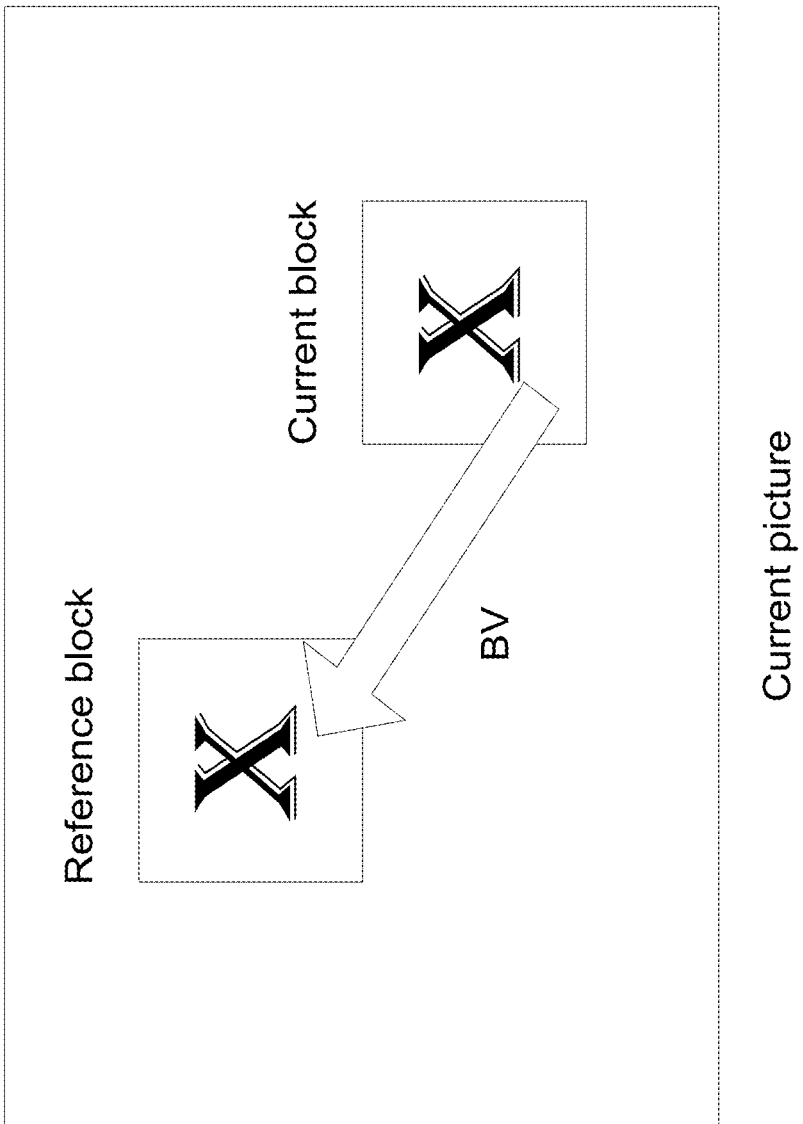
FIG. 1 shows an example of current picture referencing.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

2 Video Coding Introduction

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2 Current Picture Referencing

Current Picture Referencing (CPR), or once named as Intra Block Copy (IBC) has been adopted in HEVC Screen Content Coding extensions (HEVC-SCC) and the current VVC test model (VTM-3.0). IBC extends the concept of motion compensation from inter-frame coding to intra-frame coding. As demonstrated in FIG. 1, the current block is predicted by a reference block in the same picture when CPR is applied. The samples in the reference block must have been already reconstructed before the current block is coded or decoded. Although CPR is not so efficient for most camera-captured sequences, it shows significant coding gains for screen content. The reason is that there are lots of repeating patterns, such as icons and text characters in a screen content picture. CPR can remove the redundancy between these repeating patterns effectively. In HEVC-SCC, an inter-coded coding unit (CU) can apply CPR if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3 CPR in HEVC Screen Content Coding extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$offsetX = (ChromaArrayType == 0)?0: (mvCLX[0] \& 0x7 ? 2:0) \quad (8\text{-}104)$$

$$offsetY = (ChromaArrayType == 0)?0: (mvCLX[1] \& 0x7 ? 2:0) \quad (8\text{-}105)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY,yNbY) set equal to (xPb+(mvLX[0]>>2)−offsetX,yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX,yPb+(mvLX[1]>>2)+nPbH−1+offsetY) as inputs, the output shall be equal to TRUE.

One or both of the following conditions shall be true:

The value of (mvLX[0]>>2)+nPbW+xB1+offsetX is less than or equal to 0.

The value of (mvLX[1]>>2)+nPbH+yB1+offsetY is less than or equal to 0.

The following condition shall be true:

$$(xPb + (mvLX[0] >> 2) + nPbSw - 1 + \text{offsetX}) / CtbSizeY - \qquad (8\text{-}106)$$
$$xCb / CtbSizeY <= yCb / CtbSizeY -$$
$$(yPb + (mvLX[1] >> 2) + nPbSh - 1 + \text{offsetY}) / CtbSizeY$$

Thus, the case that the reference block overlaps with the current block or the reference block is outside of the picture will not happen. There is no need to pad the reference or prediction block.

2.4 CPR/IBC in VVC Test Model

In the current VVC test model, i.e. VTM-3.0 design, the whole reference block should be with the current coding tree unit (CTU) and does not overlap with the current block. Thus, there is no need to pad the reference or prediction block.

When dual tree is enabled, the partition structure may be different from luma to chroma CTUs. Therefore, for the 4:2:0 colour format, one chroma block (e.g., CU) may correspond to one collocated luma region which have been split to multiple luma CUs.

The chroma block could only be coded with the CPR mode when the following conditions shall be true:

(1) each of the luma CU within the collocated luma block shall be coded with CPR mode
(2) each of the luma 4×4 block' BV is firstly converted to a chroma block's BV and the chroma block's BV is a valid BV.

If any of the two condition is false, the chroma block shall not be coded with CPR mode.

It is noted that the definition of 'valid BV' has the following constraints:

(1) all samples within the reference block identified by a BV shall be within the restricted search range (e.g., shall be within the same CTU in current VVC design).
(2) all samples within the reference block identified by a BV have been reconstructed.

2.5 CPR/IBC in JVET-L0297/JVET-M0407/JVET-M0408

In VTM3.0, the reference area for CPR/IBC is restricted to the current CTU, which is up to 128×128. JVET-L0297/JVET-M0407/JVET-M0408 present methods to dynamically change the reference area to reuse memory to store reference samples for CPR/IBC so that a CPR/IBC block can have more reference candidate while the reference buffer for CPR/IBC can be kept or reduced from one CTU.

Figure 2:
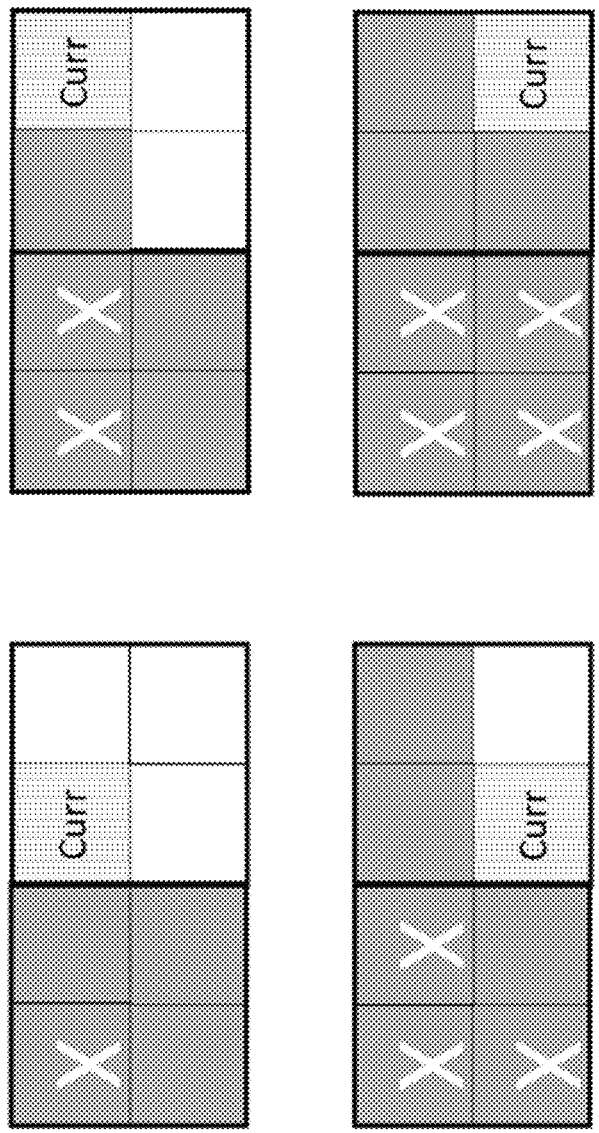
FIG. 2 shows an example a dynamic reference area in JVET-M0407.

FIG. 2 shows a method, where a block is of 64×64 and a CTU contains 4 64×64 blocks. When coding a 64×64 blocks, previous 3 64×64 blocks can be used as reference. By doing so, a decoder just needs to store 4 64×64 blocks to support CPR/IBC. The above method was adopted into VTM4.0.

Suppose that the current luma CU's position relative to the upper-left corner of the picture is (x, y) and block vector is (BVx, BVy). In the current design, if the BV is valid can be told by that the luma position ((x+BVx)>>6<<6+(1<<7), (y+BVy)>>6<<6) has not been reconstructed and ((x+BVx)>>6<<6+(1<<7), (y+BVy)>>6<<6) is not equal to (x>>6<<6, y>>6<<6).

2.6 Virtual IBC Buffer Proposed in JVET-O1170

A virtual buffer concept is introduced to help describing the reference region for IBC prediction mode. For CTU size being ctbSize, we denote wIbcBuf=128*128/ctbSize and define a virtual IBC buffer, ibcBuf, with width being wIbcBuf and height being ctbSize. Thus, For CTU size being 128×128, the size of ibcBuf is also 128×128.

For CTU size being 64×64, the size of ibcBuf is 256×64.

For CTU size being 32×32, the size of ibcBuf is 512×32.

It is noted that VPDU width and height are min(ctbSize, 64). We denote Wv=min(ctbSize, 64).

The virtual IBC buffer, ibcBuf is maintained as follows.

(1) At the beginning of decoding each CTU row, refresh the whole ibcBuf with value (−1).
(2) At the beginning of decoding a VPDU (xVPDU, yVPDU) relative to the top-left corner of the picture, set the ibcBuf[x][y]=−1, with x=xVPDU%wIbcBuf, . . . , xVPDU% wIbcBuf+Wv−1; y=yVPDU%ctbSize, . . . , yVPDU%ctbSize+Wv−1.
(3) After decoding a CU contains (x, y) relative to the top-left of the picture, set $$ibcBuf[x \% wIbcBuf][y \% ctbSize] = recSample[x][y]$$

So a bitstream constrain can be simply described as

It is a requirement of bitstream conformance that for a bv, ibcBuf[(x+bv[0])% wIbcBuf][(y+bv[1]) % ctbSize] shall not be equal to −1.

With the concept of IBC reference buffer, it also simplifies the text for the decoding process by avoid reference to the inter interpolation and motion compensation process, including subblock process.

2.7 VPDU

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied in VTM5:

TT split is not allowed for a CU with either width or height, or both width and height equal to 128.

For a 128×N CU with N≤64 (i.e. width equal to 128 and height smaller than 128), horizontal BT is not allowed.

For an N×128 CU with N≤64 (i.e. height equal to 128 and width smaller than 128), vertical BT is not allowed.

In VVC, generally it is agreed that the width and height of a VPDU is min(64, CtbSizeY) in luma samples. So for CTB/CTU size being 64×64, 128×128 or 256×256, VPDU size is 64×64. For CTB/CTU size being 32×32, VPDU size is 32×32.

2.8 Buffer Management and Block Vector Coding for Intra Block Copy

Various IBC buffer features and details for its corresponding management are described in PCT/CN2019/093552, which is incorporated by reference.

2.9 In-Loop Reshaping (ILR) in JVET-M0427

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT [$Y_r$]. ($\hat{Y}_i$ represents the reconstruction values of $Y_i$.).

2.9.1 PWL Model

Conceptually, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y = ((y2 - y1)/(x2 - x1)) * (x - x1) + y1$$

In fixed point implementation, the equation can be rewritten as:

$$y = ((m * x + 2FP\_PREC - 1) >> FP\_PREC) + c$$

Herein, m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without pre-computing the LUTs.

2.9.2 Test CE12-2

2.9.2.1 Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 3:
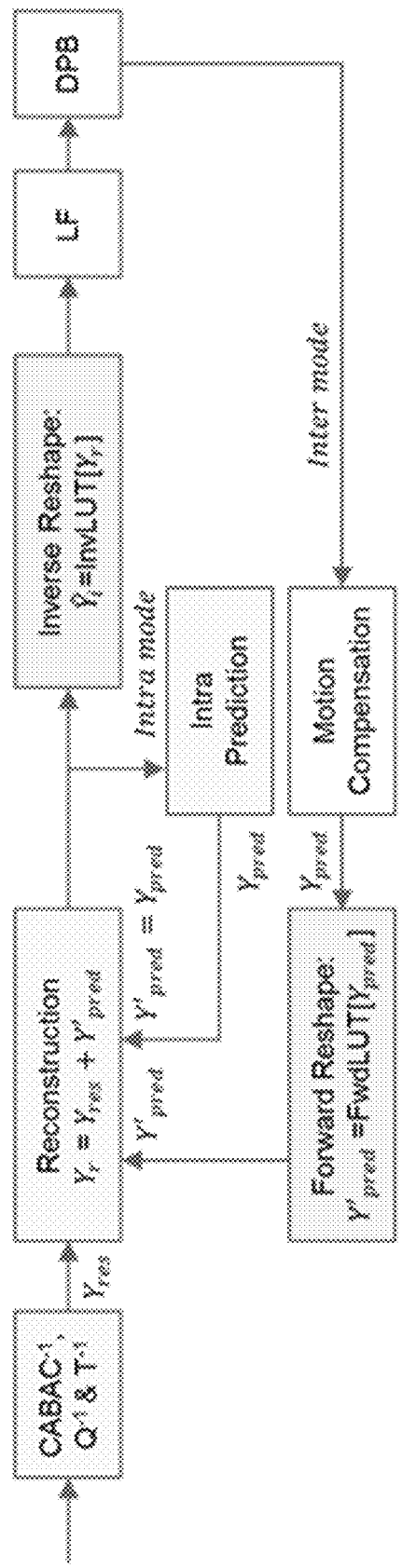
FIG. 3 shows a flowchart of a decoding flow with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 3 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (lighter shaded blocks indicate signal in reshaped domain: luma residue; intra luma predicted; and intra luma reconstructed)

2.9.2.2 Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.

For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values.

2.9.2.3 Signaling of ILR Side Information

The parameters are (currently) sent in the tile group header (similar to ALF). These reportedly take 40-100 bits.

The following spec is based on version 9 of JVET-L1001. The added syntax is prefixed with "++". In 7.3.2.1 Sequence parameter set RBSP syntax

| | Descriptor |
|---|---|
| seq_pammeter_set_rbsp( ) { | |
|   sps_seq_parameter_set_id | ue(v) |
|   ... | |
|   sps_triangle_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for(i = 0; i < sps_num_ladf_intervals_minus2 + 1; i++ ) { | |
|       sps_ladf_qp_offset[i] | se(v) |
|       sps_ladf_delta_threshold_minus1[i] | ue(v) |
|     } | |
|   } | |
| ++ sps_reshaper_enabled_flag | u(1) |
|   rbsp_trailing_bits( ) | |
| } | |

In 7.3.3.1 General tile group header syntax

| | Descriptor |
|---|---|
| tile_group_header( ) { | |
|   ... | |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[i] | u(v) |
|   } | |
| ++ if ( sps_reshaper_enabled_flag ) { | |
| ++   tile_group_reshaper model_present_flag | u(1) |
| ++   if ( tile_group_reshaper_model_present_flag ) | |
| ++     tile_group_reshaper_model( ) | |
| ++   tile_group_reshaper_enable_flag | u(1) |
| ++   if ( tile_group_reshaper_enable_flag&& (!( qtbtt_dual_tree_intra_flag&& tile_group_type == I ) ) ) | |
| ++     tile_group_reshaper_chroma_residual_scale_flag | u(1) |
| ++ } | |
|   byte_alignment( ) | |
| } | |

Add a new syntax table tile group reshaper model:

| | Descriptor |
|---|---|
| ++tile_group_reshaper_model( ) { | |
| ++   reshaper_model_min_bin_idx | ue(v) |
| ++   reshaper_model_delta_max_bin_idx | ue(v) |
| ++   reshaper_model_bin_delta_abs_cw_prec_minus1 | ue(v) |
| ++   for ( i = reshaper_model_min_bin_idx; i<= reshaper_model_max_bin_idx; i++ ) { | |
| ++     reshape_model_bin_delta_abs_CW [i] | u(v) |
| ++     if ( reshaper_model_bin_delta_abs_CW[i] ) > 0 ) | |
| ++       reshaper_model_bin_delta sign_CW_flag[i] | u(1) |
| ++   } | |
| ++} | |

++ In General sequence parameter set RBSP semantics, add the following semantics:
sps_reshaper_enabled_flag equal to 1 specifies that reshaper is used in the coded video sequence (CVS). sps_reshaper_enabled_flag equal to 0 specifies that re shaper is not used in the CVS.
++ In tile group header syntax, add the following semantics
tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.
tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.
tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.
++Add tile_group_reshaper_model( ) syntax
reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.
reshape_model_delta max_bin_idx specifies the maximum allowed bin (or piece) index MaxBinIdx minus the maximum bin index to be used in the re shaper construction process. The value of reshape_model_max_bin_idx is set equal to MaxBinIdx—reshape_model_delta_max_bin_idx.
reshaper_model_bin_delta_abs_cw_prec_minus1 plus 1 specifies the number of bits used for the representation of the syntax reshape_model_bin_delta_abs_CW[i].
reshape_model_bin_delta_abs_CW[i] specifies the absolute delta codeword value for the ith bin.
reshaper_model_bin_delta_sign_CW_flag[i] specifies the sign of reshape_model_bin_delta_abs_CW[i] as follows:

If reshape_model_bin_delta_sign_CW_flag[i] is equal to 0, the corresponding variable Rsp DeltaCW[i] is a positive value.
Otherwise (reshape_model_bin_delta_sign_CWflag[i] is not equal to 0), the corresponding variable RspDeltaCW[i] is a negative value.
When reshape_model_bin_delta_sign_CW_flag[i] is not present, it is inferred to be equal to 0. The variable RspDeltaCW[i]=(1 2*reshape_model_bin_delta_sign_CW [i])*reshape_model_bin_delta_abs_CW[i];
The variable RspCW[i] is derived as following steps:
The variable OrgCW is set equal to $(1<<BitDepth_Y)/(MaxBinIdx+1)$.

If reshaper_model_min_bin_idx<=i<=reshaper_model_max_bin_idx $$RspCW[i] = OrgCW + RspDeltaCW[i].$$

Otherwise, RspCW[i]=0.
The value of RspCW[i] shall be in the range of 32 to 2*OrgCW−1 if the value of $BitDepth_Y$ is equal to 10.
The variables InputPivot[i] with i in the range of 0 to MaxBinIdx+1, inclusive are derived as follows $$InputPivot[i] = i * OrgCW$$

The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

```
shiftY = 14
ReshapePivot[ 0 ] = 0;
for( i = 0; i <= MaxBinIdx ; i++) {
    ReshapePivot[ i + 1 ] = ReshapePivot[ i ] + RspCW[ i ]
    ScaleCoef[ i ] = ( RspCW[ i ] * (1 << shiftY) + (1 << (Log2(OrgCW) - 1))) >> (Log2(OrgCW))
    if ( RspCW[ i ] == 0 )
        InvScaleCoeff[ i ] = 0
    else
        InvScaleCoeff[ i ] = OrgCW * (1 << shiftY) / RspCW[ i ]
}
```

The variable ChromaScaleCoef[i] with i in the range of 0 to MaxBinIdx, inclusive, are derived as follow:
ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};

shiftC = 11
— if ( RspCW[ i ] == 0 )
ChromaScaleCoef [i] = (1 << shiftC)
— Otherwise (RspCW[ i ] != 0), ChromaScaleCoef[ i ] = ChromaResidualScaleLut[RspCW [ i ] >> 1 ]

2.9.2.4 Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residuals are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
- Current block is intra-coded
- Current block is coded as CPR (current picture referencing, aka intra block copy, IBC)
- Current block is coded as combined inter-intra mode (CIIP) and the forward reshaping is disabled for the intra prediction block

3 Drawbacks of Existing Implementations

In the current design of IBC virtual buffer, some problems exist.
(1) How to maintain IBC virtual buffer when CTU size is larger than 128×128 is not defined.
(2) The relationship between virtual buffer size and size of reference samples is not clear.
(3) Line buffer for IBC mode and BV for CTU row may be reduced.
(4) Subpicture might be too restricted.
(5) Chroma QP table may not be designed in a right way.

4 Example Methods for General Virtual Buffers for IBC

Denote the width and height of a VPDU by vSize, e.g., vSize=min(64, ctbSizeY), where ctbSizeY is the luma CTB/CTU width/height.

Embodiments of the presently disclosed technology overcome the drawbacks of existing implementations, thereby providing video coding with higher coding efficiencies. The methods for general virtual buffers for IBC, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

IBC Buffer Related

1. The size of IBC virtual buffer (e.g., which is used to decide whether a block vector or a mapped sample's validity) may depend on VPDU size, CTB/CTU size.
   a. In one example, the width times height of the virtual buffer may be fixed, however, the width and/height of the virtual buffer may depend on VPDU size and/or CTB/CTU size.
   b. In one example, the height of the virtual buffer may be equal to the height of CTB/CTU.
      i. Alternatively, furthermore, the the width of the virtual buffer may be set to (IBC virtual buffer size/height of CTB).
   c. In one example, the width of the virtual buffer may be equal to the width of CTB/CTU.
   d. In one example, the width of the virtual buffer may be one or multiple times of VPDU width
   e. In one example, the height of the virtual buffer may be one or multiple times of VPDU height 2. It is proposed to allocate a larger IBC virtual buffer size compared to the required memory size for IBC BV searching area.
   a. In one example, the IBC virtual buffer size may be larger than the total size of VPDU memory used for IBC.
      i. In one example, one more CTU may be allocated to IBC virtual buffer.
   b. In one example, the width of the IBC virtual buffer size may be (128*128/ctbSizeY+ctbSizeY).
   c. In one example, the width of the IBC virtual buffer size may be (128*128/ctbSizeY+ctbSizeY) and the height of the IBC virtual buffer size may be ctbSizeY.
   d. In one example, the width of the IBC virtual buffer may be (256*128/ctbSizeY). Alternatively, furthermore, the height of the IBC virtual buffer may be ctbSizeY.
   e. In one example, a larger IBC virtual buffer may be allocated for a larger CTU/CTB.
      i. In one example, when CTU size is no smaller than K (e.g., K=128), the width of the IBC virtual buffer may be (128*128/ctbSizeY+tbSizeY). Alternatively, furthermore, the height of the IBC virtual buffer may be ctbSizeY.
      ii. In one example, when CTU size is smaller than K (e.g., K=128), the width of the IBC virtual buffer may be (128*128/ctbSizeY). Alternatively, furthermore, the height of the IBC virtual buffer may be ctbSizeY.

3. The reference block for an IBC block may be constrained to be fully within a certain VPDU row or VPDU column
   a. In one example, the reference block may be disallowed to cross different VPDU rows.
   b. In one example, the reference block may be disallowed to cross different VPDU columns.
   c. In one example, the above VPDU row or column may be relative to the picture.
   d. In one example, the above VPDU row or column may be relative to the IBC virtual buffer.
   e. Alternatively, furthermore, the above methods may be invoked when the reference block pointed by a BV cross two or more CTUs/CTBs.

4. The reference block for an IBC block may cross multiple VPDUs/cross different VPDU rows/VPDU columns. However, additional operations may be required to fill in some prediction values in the reference block.
   a. In one example, some default values may be utilized to fill in some prediction values.

5. A range constrain may be applied to block vectors (BVs) and/or block vector differences (BVD) used in IBC mode.
   a. In one example, the allowed range of BV/BVDs may depend on the location of current IBC coded block, such as coordinators relative to the CTU/CTB covering current block.
   b. In one example, block vectors may be constrained in the range of $[-2^m, 2^m-1]$
   c. In one example, block vector differences after precision conversion may be constrained in the range of $[-2^n, 2^n-1]$
   d. In one example, block vector differences after precision conversion may be constrained in the range of $[-2^n+1, 2^n-1]$
   e. In one example, block vector differences signalled in the bitstreams may be constrained in the range of $[-2^n, 2^n-1]$ f. In one example, block vector differences signalled in the bitstreams may be constrained in the range of $[-2^n+1, 2^n-1]$
g. In one example, m is set to 18 or 17 or 15.
h. In one example, n is set to 17 or 16 or 14.
i. In one example, m and/or may depend on the precision for BV/motion vector storage and/or the precision associated with the block vector differences.
j. In one example, block vectors may be constrained in the same range as motion vectors used for inter prediction mode.
k. In one example, block vector differences may be constrained in the same range as motion vector vectors used for inter prediction mode.
l. In one example, a conformance bitstream shall satisfy that the above sub-bullet is satisfied.
  i. Alternatively, a clipping process to the BV/BVD may be applied to decoded BV/BVD before BV/BVDs are utilized to encode/decode a block.
6. The number of available samples mapped to the IBC virtual buffer may be restricted.
  a. In one example, the maximum number of available samples mapped to the buffer may be smaller than the IBC virtual buffer size.
  b. In one example, the maximum number of available samples mapped to the IBC virtual buffer may be fixed when CTB/CTU size is larger than 64×64.
  c. In one example, the number of available samples mapped to the IBC virtual buffer may be restricted to be smaller or equal to one or multiple times of number of samples in a VPDU.
    i. In one example, the number of available samples mapped to the IBC virtual buffer may be restricted to be smaller or equal to three times of number of samples in a VPDU when CTU/CTB size is larger than 64×64.
7. The unavailability marking for IBC reference samples mapped to the IBC virtual buffer may be performed in the granularity of VPDU
  a. In one example, when samples are needed to be marked as unavailable, samples within the same VPDU may also be marked as unavailable.
  b. In one example, one or multiple VPDUs may be marked as unavailable simultaneously.
  c. In one example, which VPDU's samples are marked to unavailable may depend on the position of the current VPDU.
  d. In one example, which VPDU's samples are marked to unavailable may depend on the position of the previous or most recently decoded VPDU.
8. The unavailability marking for IBC reference samples mapped to the IBC virtual buffer may be performed right before encoding/decoding a video unit (e.g., a CU/PU/TU). In one example, for a W×H video unit with top-left position (X, Y) related to the top-left of the slice/tile/brick/subpicture/picture containing the video unit, the following may apply.
  a. In one example, right before encoding/decoding a video unit, the corresponding area in the virtual buffer may be marked as unavailable.
  b. In the above example, the corresponding IBC virtual buffer area may be a luma area with x=(X%IBC_buf_width) . . . (X%IBC_buf_width)+W−1 and y=(Y%IBC_buf_height) . . . (Y%IBC_buf_height)+H−1.
  c. In the above examples, the corresponding IBC virtual buffer area may be a chroma area with x=(X%IBC_buf_width)/SubWidthC . . . ((X%IBC_buf_width)+W−1)/SubWidthC and y=(Y%IBC_buf_height)/SubHeightC . . . ((Y%IBC_buf_height)+H−1)/SubHeightC.
  d. In the above examples, IBC_buf_width refers to IBC virtual buffer width; IBC_buf_height refers to IBC virtual buffer height.
  e. Alternatively, the unavailability marking for IBC reference samples mapped to the IBC virtual buffer may be performed right before encoding/decoding a K*L samples/pixels in a video unit.
    i. In one example, K and/or L are both equal to 1.
    ii. In one example, K and/or L are set to the sub-block size used in a CU/PU.
9. When CTU/CTB size is larger than 64×64, IBC reference may be the current VPDU and the three most recently decoded VPDUs.
  a. In one example, an index may be maintained for each VPDU mapped to the virtual IBC buffer to track the decoding order of each VPDU.
10. A counter may be maintained to track the number of available VPDUs mapped to the buffer.
  a. In one example, the counter is reset to 0 at beginning of decoding each CTU row and increased by one when one VPDU mapped to the buffer has been decoded.
  b. In one example, when the counter is larger than a certain value, e.g. 3, one VPDU's samples mapped to the buffer may be marked as unavailable and the counter may be decreased by 1.
11. When CTU/CTB size is 128×128, the corresponding IBC virtual buffer may be of size 256×128.
  a. Alternatively, the IBC virtual buffer may be of size (k*64)×128, where k>2.
12. When CTU/CTB size is 256×256, the corresponding IBC virtual buffer may be of size 64×256 to track availability of reference samples, i.e. ibcBufW=64, ibcBufH=256.
  a. In one example, before decoding a VPDU with top-left position(x0, y0), the corresponding VPDU row (0, y0%256) in the IBC buffer will be set to −1.
13. When CTU/CTB size is 256×256, the corresponding IBC virtual buffer may be of size 128×256 to track availability of reference samples, i.e. ibcBufW=128, ibcBufH=256.
  a. In one example, only one VPDU may be kept (excluding the current VPDU) for each VPDU row in the buffer except for a certain VPDU row.
    i. In one example, only one VPDU may be kept (excluding the current VPDU) for each VPDU row in the buffer except for the last VPDU row.
14. IBC buffer may be not reset at the beginning of a CTU row.
  a. In one example, the IBC virtual buffer inherited from the above CTU row may be used as the initial state of the current CTU row.
  b. Alternatively, IBC virtual buffer may be partially reset at the beginning of a CTU row.
    i. In one example, a VPDU in the above CTU row may be inhertied in the current IBC buffer while other buffer region may be reset.
    ii. In one example, the most bottom-left VPDU of the above CTU row may be inhertied in the current IBC buffer while other buffer region may be reset.
15. Whether and/or how to mark samples in the buffer as unavailable may be independent of chroma block position.

a. In one example, only when a luma block is of the 1st block in a VPDU, corresponding samples in the IBC buffer may be marked as unavailable.
b. In one example, it may be disallow to reset or marked samples in the buffer as unavailable when decoding a chroma coding unit.

16. It is proposed at the beginning of decoding each VPDU, the corresponding IBC virtual buffer area may be reset based on the current VPDU position.
   a. In one example, the IBC virtual buffer area corresponding to (xVPDU+ctbSizeY, yVPDU) will be reset, where (xVPDU, yVPDU) denotes the current VPDU's position relative to the top-left of the picture.

17. Whether and/or how to mark samples in the IBC virtual buffer may depend on the most recently decoded VPDU's position and the VPDU size.
   a. In one example, whether and/or how to mark samples in the IBC virtual buffer as unavailable may depend on the most recently decoded VPDU's position a brick/slice/tile/picture.
   b. In one example, whether and/or how to mark samples in the IBC virtual buffer as unavailable may depend on the most recently decoded VPDU's position in a CTU row of a brick/slice/tile/picture.
   c. In one example, what samples in the IBC virtual buffer to be marked as unavailable may be independent of the current block's position.

IBC Line Buffer Related

18. Block vector prediction acrossing a CTU row may be disallowed
   a. In one example, when a block vector prediction is from a different CTU row compared to the current CTU row, it may be considered as unavailable.

19. Deblocking decision for the current IBC blocks acrossing a CTU row may be independent of the other block's block vector or motion vector.
   a. In one example, when two blocks are of different CTU row and one block is coded in IBC mode and the other is coded in IBC or Inter mode, the deblocking boundary strength may be always set equal to 1.
   b. In one example, when two blocks are of different CTU row and one block is coded in IBC mode and the other is coded in IBC or Inter mode, the deblocking boundary strength may be always set equal to 0.

20. Deblocking decision for the current IBC blocks acrossing CTU row may be independent of whether the other block is coded in IBC mode or Inter mode.
   a. In one example, when two blocks are of different CTU row and one block is coded in IBC mode and the other is not coded in Intra mode, the deblocking boundary strength may be always set equal to 1.

Subpicture Related

21. It is proposed to allow predictions (e.g., motion/sample prediction) among two subpictures under certain conditions.
   a. In one example, if a boundary of a first subpicture coincides with the picture boundary (or conformance window boundary), it may be allowed to use information from a second subpicture.
      i. Alternatively, furthermore, the subpicture boundary is the left or right subpicture boundary.
      ii. Alternatively, furthermore, the picture boundary is the left or right picture boundary.
      iii. In one example, the left (or right) boundary of the second subpicture may coincide with the left (or right) boundary of the picture.
   b. The condition is true only if picture wrapping is allowed (e.g. sps_ref_wraparound_enabled_flag is equal to 1)

22. Picture wrapping excludes subpictures.
   a. In one example, picture wrapping is enabled if subpictures are used.
   b. In one example, subpictures cannot be used if picture wrapping is enabled.
   c. Alternatively, picture wrapping may be enabled when subpicture is used.
      iv. In one example, picture wrapping may be enabled for a sub-picture which has a boundary coinciding with the picture boundary.

Chroma QP Table Related

23. The smallest index of chroma QP table may be independent to the bit depth for chroma component.
   a. In one example, the smallest index of chroma QP table may depend on the bit depth of luma component.
   b. In one example, the smallest index of chroma QP table may be QpBdOffset$_y$, i.e. 6*bit_depth_luma_minus8.

5 Example implementations of the disclosed technology 5.1 Embodiment #1

When CTU size is 256×256, a 64×256 IBC virtual buffer ibcBuf is maintained, i.e. ibcBufW=64, ibcBufH=256. VPDU size is 64×64 and beside the current VPDU, 3 additional VPDU's on-chip memory is used to store IBC reference samples.

The buffer ibcBuf is reset to −1 at the beginning of decoding a CTU row.

At the beginning decoding a new VPDU with top-left position (x0, y0) relative to the top-left corner of the picture, the following applies 1) For x=x0 . . . x0+63, y=y0 . . . y0+63, ibcBuf[x%ibcBufW][y%ibcBufH]=−1
2) After decoding a CU, for (x, y) in that CU relative to the top-left corner of the picture, set ibcBuf[x%ibcBufW][y%ibcBufH] as the reconstructed value of sample (x, y) before in-loop filtering, e.g. SAO, deblocking, ALF.
3) Given a by, the reference for (x, y) is ibcBuf[(x+bv[0])%ibcBufW][(y+bv[1])%ibcBufH]

It is a bitstream constrain that the following two conditions shall be true

1) Given a W×H block with top-left position (x, y) relative the top-left of the picture, (y%ibcBufH)+H>=ibcBufH
2) ibcBuf[(x+bv[0])%ibcBufW][(y+bv[1])%ibcBufH] shall not contain invalid pixel value, e.g. −1, for x=0 . . . W−1, y=0 . . . , H−1

5.2 Embodiment #2

When CTU size is 256×256, a 128×256 IBC virtual buffer ibcBuf is maintained, i.e. ibcBufW=128, ibcBufH=256. VPDU size is 64×64 and beside the current VPDU, 3 additional VPDU's on-chip memory is used to store IBC reference samples.

The buffer ibcBuf is reset to −1 at the beginning of decoding a CTU row. xPrevVPDU=0 and yPrevVPDU=0.

At the beginning decoding a new VPDU with top-left position (x0, y0) relative to the top-left corner of the picture, the following applies 1) If (yPrevVPDU+64)%ibcBufH is not equal to 0, for x=x0 . . . x0+63, y=y0 . . . y0+63, ibcBuf[(x+xPrev VPDU−64)%ibcBufW][(y+yPrevVPDU)%ibcBufH]=−1

2) Otherwise ((yPrevVPDU+64)%ibcBufH is equal to 0), for x=x0 ... x0+63, y=y0 ... y0+63, ibcBuf[(x+xPrev VPDU)%ibcBufW][(y+yPrevVPDU)%ibcBufH]=−1

3) xPrevVPDU=x0 and yPrevVPDU=y0

It is a bitstream constrain that the following two conditions shall be true
1) Given a W×H block with top-left position (x, y) relative the top-left of the picture, (y%ibcBufH)+H<=ibcBufH
2) ibcBuf[(x+bv[0])%ibcBufW][(y+bv[1])%ibcBufH] shall not contain invalid pixel value, e.g. −1, for x=0 ... W−1, y=0 ..., H−1

5.3 Embodiment #3

This embodiment reflects bullet 2. Changes, marked in bold faced italics, are based on VVC draft 6 document WET-O2001-vE.
log 2_min_luma_coding_block size_minus2 plus 2 specifies the minimum luma coding block size.
The variables Ctb Log 2SizeY, CtbSizeY, MinCb Log 2SizeY, MinCbSizeY, IbcBufWidthY, IbcBufWidthC and Vsize are derived as follows:

$$CtbLog2SizeY = \log2\_ctu\_size\_minus5 + 5 \quad (7-15)$$

$$CtbSizeY = 1 << CtbLog2SizeY \quad (7-16)$$

$$MinCbLog2SizeY = \quad (7-17)$$
$$\log2\_min\_luma\_coding\_block\_size\_minus2 + 2$$

$$MinCbSizeY = 1 << MinCbLog2SizeY \quad (7-18)$$

$$IbcBufWidthY = 128 * 128 / CtbSizeY + CtbSizeY \quad (7-19)$$

$$IbcBufWidthC = IbcBufWidthY / SubWidthC \quad (7-20)$$

$$VSize = \text{Min}(64, CtbSizeY) \quad (7-21)$$

5.4 Embodiment #4

This embodiment reflects bullet 3.
Denote (xCb, yCb) as the top-left position of the current block relative to top-left of the picture.
Block width and height are W and H respectively. Block vector for the block is (xBv, yBv)
Constrain of VPDU row relative to the picture:
It is a bitstream constrain that (xCb+xBv)/vSize shall be equal to (xCb+xBv+W−1/vSize).
Constrain of VPDU column relative to the picture:
It is a bitstream constrain that (yCb+yBv)/vSize shall be equal to (yCb+yBv+H−1/vSize).
Constrain of VPDU row relative to the IBC buffer:
It is a bitstream constrain that ((xCb+xBv)%IbcBufWidthY)/vSize shall be equal to (((xCb+xBv+W−1)%IbcBufWidthY)/vSize).
Constrain of VPDU column relative to the IBC buffer:
It is a bitstream constrain that ((yCb+yBv)%IbcBufHeightY)/vSize shall be equal to (((y Cb+yBv+H−1)%IbcBufHeightY)/vSize).

5.5 Embodiment #5

This embodiment reflects that marking samples in the IBC virtual buffer as unavailable should be independent of chroma blocks.
The changes marked in *bold and italic* are based on WET-O2001-vE. Deleted texts are marked with double brackets (e.g., [[a]] denotes the deletion of the character "a").

7.4.9.5 Coding Unit Semantics
When ResetIbcBuf is equal to 1, the following applies:
For x=0 ... IbcBufWidthY−1 and y=0 ... CtbSizeY−1, the following assignments are made:

$$IbcVirBuf[0][x][y] = -1 \quad (7\text{-}153)$$

The variable ResetIbcBuf is set equal to 0.
When x0% VSize is equal to 0 and y0% VSize is equal to 0 and cIdx is equal to 0, the following assignments are made for x=x0 ... x0+VSize−1 and y=y0 ... y0+VSize−1:

$$IbcVirBuf[0][x \% IbcBufWidtyY][y \% CtbSizeY] = -1 \quad (7\text{-}154)$$

5.6 Embodiment #6

7.4.9.5 Coding Unit Semantics
When ResetIbcBuf is equal to 1, the following applies:
For x=0 ... IbcBufWidthY−1 and y=0 ... CtbSizeY−1, the following assignments are made:

$$IbcVirBuf[0][x][y] = -1 \quad (7\text{-}153)$$

*xPrevV = 0*
*yPrevV = 0*
The variable ResetIbcBuf is set equal to 0.
When x0% VSize is equal to 0 and y0% VSize is equal to 0 *and cIdx is equal to 0, the following applies:*
*[[assignments are made for x = x0..x0 + VSize − 1 and y = y0..y0 + VSize − 1:]] If yPrevV % VSize is equal to 0,*
*xP is set equal to xPrevV − (CtbLog2SizeY == 7) ? 128 : (−VSize), otherwise xP is set equal to xPrevV − (CtbLog2SizeY == 7) ? 64 : (−VSize).*
*For x = xP..xP + max(VSize, cbWidth) −1*
*and y = yPrevV.. yPrevV + max*
*(VSize, cbHeight) −1, the follwing assignment are made*

$$IbcVirBuf[0][x \% IbcBufWidthY][y \% CtbSizeY] = -1 \quad (7\text{-}154)$$

*The variables xPrevV is set equal to*
*(x0 + cbWidth − 1) / VSize * VSize*
*and yPrevV is set equal to (y0 + cbHeight − 1) / VSize * VSize.*

5.7 Embodiment #7

This embodiment gives an example of allowing subpicture prediction. The changes compared to JVET-O2001-vE are highlighted in *bold and italic.*
8.5.6.3.3 Luma Integer Sample Fetching Process
Inputs to this process are:
 a luma location in full-sample units ($xInt_L$, $yInt_L$),
 the luma reference sample array $refPicLX_L$,
Output of this process is a predicted luma sample value predSampleLXL
The variable shift is set equal to Max(2, 14−$BitDepth_Y$).
The variable picW is set equal to pic_width_in_luma_samples and the variable picH is set equal to pic_height_in_luma_samples.
The luma locations in full-sample units (xInt, yInt) are derived as follows:

*If subpic_treated_as_pic_flag [SubPicIdx] is equal to 1, the following applies:*

$xInt = Clip3(SubPicLeftBoundaryPos, SubPicRightBoundaryPos, sps\_ref\_wraparound\_enabled\_flag\ ?$ (8-782)

$ClipH((sps\_ref\_wraparound\_offset\_minus1 + 1) * MinCbSizeY, picW, xIntL) : xInt)$ $yInt = Clip3(SubPicTopBoundaryPos, SubPicBotBoundaryPos, yInt)$ (8-782)

*Otherwise:*

$xInt =$ (8-782)
$\quad Clip3(0, picW - 1, sps\_ref\_wraparound\_enabled\_flag ? ClipH$
$\quad\quad ((sps\_ref\_wraparound\_offset\_minus1 + 1) * MinCbSizeY,$
$\quad\quad\quad picW, xInt_L) : xInt_L)$ $yInt = Clip3(0, picH - 1, yInt_L)$ (8-783)

The predicted luma sample value predSampleLX$_L$ is derived as follows:

$predSampleLX_L = refPicLX_L[xInt][yInt] << shift3$ (8-784)

5.8 Embodiment #8

This embodiment shows an examplary design of chroma QP table. The changes, marked in bold and italic, are based on JVET-O2001-vE. Deleted texts are marked with double brackets (e.g., [[a]] denotes the deletion of the character "a").

7.4.3.3 Sequence Parameter Set RBSP Semantics

The i-th chroma QP mapping table ChromaQpTable[i] for i=0 . . . same_qp_table_for_chroma ? 0:2 is derived as follows:

```
qpInVal[ i ][ 0 ] = [ [QpBdOffset_C ]]QpBdOffset_Y+ delta_qp_in_val_minus1[ i ][ 0 ]
qpOutVal[ i ][ 0 ] = -QpBdOffset_C + delta_qp_out_val[ i ][ 0 ]
for( j = 1; j <= num_points_in_qp_table_minus1[ i ] j++ ) {
    qpInVal[ i ][ j ] = qpInVal[ i ][ j - 1 ] + delta_qp_in_val_minus1[ i ][ j ] + 1
    qpOutVal[ i ][ j ] = qpOutVal[ i ][ j - 1 ] + delta_qp_out_val[ i ][ j ]
}
ChromaQp Table[ i ][ qpInVal[ i ][ 0 ]] = qpOutVal[ i ][ 0 ]
for( k = qpInVal[ i ][ 0 ] - 1; k >= [[ QpBdOffset_C ]]QpBdOffset_Y; k— )
    ChromaQpTable[ i ][ k ] = Clip3( -QpBdOffset_C, 63, ChromaQp Table [ i ][ k + 1 ] - 1 )    (7-31)
for( j = 0; j < num_points_in_qp_table_minus1 [ i ]; j++ ) {
    sh = ( delta_qp_in_val_minus1[ i ][j + 1 ] + 2 ) >> 1
    for(k = qpInVal[ i ][ j ] + 1, m = 1; k <= qpInval[i][ j + 1 ]; k++, m++ )
        ChromaQp Table[ i ][ k ] = ChromaQp Table [ i ][ qpInVal[ i ][ j ] ] +
                ( delta_ qp_out_val[ i ][j + 1 ] * m + sh ) / ( delta_qp_in_val_minus1
[ i ][j + 1] + 1 )
}
for( k = qpInVal[i] [ num_points_in_qp_table_minus1[ i ] ] + 1; k <= 63; k++ )
    ChromaQp Table[ i ][ k ] = Clip3( -QpBdOffsetc, 63, ChromaQpTable[ i ][ k - 1 ] + 1 )
```

When same_qp_table_for_chroma is equal to 1, ChromaQpTable[1][k] and ChromaQpTable[2][k] are set equal to ChromaQpTable[0][k] fork=[ *QpBdOffset_C*//*QpBdOffset_Y* . . . 63.
It is a requirement of bitstream conformance that the values of qpInVal[i][j] *shall be in the range of –QpBdOffset_Y* to 63, and qpOutVal[i][j] shall be in the range of –QpBdOffset$_C$ to 63, inclusive for i=0 . . . same_qp_table_for_chroma ? 0:2 and j=0 . . . num_points_in_qp_table_minus1[i].

5.9 Embodiment #9

This embodiment shows an examplar design of an enlarged IBC virtual buffer. The changes, marked in Italic and bold, are based on JVET-O2001-vE. Deleted texts are marked with double brackets (e.g., [[a]] denotes the deletion of the character "a").

7.4.3.3 Sequence Parameter Set RBSP Semantics

The variables Ctb Log 2SizeY, CtbSizeY, MinCb Log 2SizeY, MinCbSizeY, IbcBufWidthY, IbcBufWidthC and Vsize are derived as follows:

$$CtbLog2SizeY = log2\_ctu\_size\_minus5 + 5 \quad (7-15)$$

$$CtbSizeY = 1 << CtbLog2SizeY \quad (7-16)$$

$$MinCbLog2SizeY = \quad (7-17)$$
$$log2\_min\_luma\_coding\_block\_size\_minus2 + 2$$

$$MinCbSizeY = 1 << MinCbLog2SizeY \quad (7-18)$$

$$IbcBufWidthY = 128 * 128 / CtbSizeY + CtbSizeY \quad (7-19)$$

$$IbcBufWidthC = IbcBufWidthY / SubWidthC \quad (7-20)$$

$$VSize = \text{Min}(64, CtbSizeY) \quad (7-21)$$

7.4.9.5 Coding Unit Semantics

When x0% VSize is equal to 0 and y0% VSize is equal to 0, the following assignments are made for x=x0 . . . x0+VSize−1 and y=y0 . . . y0+VSize−1:

$$IbcVirBuf[0][(x + CtbSizeY) \% IbcBufWidthY] \quad (7-154)$$
$$[y \% CtbSizeY] = -1$$

5.10 Embodiment #10

This embodiment shows an examplar design of an enlarged IBC virtual buffer. The changes, marked in Italic and bold, are based on JVET-O2001-vE. Deleted texts are marked with double brackets (e.g., [[a]] denotes the deletion of the character "a").

7.4.3.3 Sequence Parameter Set RB SP Semantics

The variables Ctb Log 2SizeY, CtbSizeY, MinCb Log 2SizeY, MinCbSizeY, IbcBufWidthY, IbcBufWidthC and Vsize are derived as follows:

$$CtbLog2SizeY = \log2\_ctu\_size\_minus5 + 5 \quad (7-15)$$

$$CtbSizeY = 1 << CtbLog2SizeY \quad (7-16)$$

$$MinCbLog2SizeY = \quad (7-17)$$
$$\log2\_min\_luma\_coding\_block\_size\_minus2 + 2$$

$$MinCbSizeY = 1 << MinCbLog2SizeY \quad (7-18)$$

$$W = CtbSizeY == 128?256:CtbSizeY$$

$$IbcBufWidthY = [[128]] * 128 / CtbSizeY \quad (7-19)$$

$$IbcBufWidthC = IbcBufWidthY / SubWidthC \quad (7-20)$$

$$VSize = \text{Min}(64, CtbSizeY) \quad (7-21)$$

7.4.9.5 Coding Unit Semantics

When x0% VSize is equal to 0 and y0% VSize is equal to 0, the following assignments are made for x=0 . . . x0+VSize−1 and y=y0 . . . y0+VSize−1:

$$IbcVirBuf[0][(x + CtbSizeY) \% \ IbcBufWidthY] \quad (7-154)$$
$$[y \% CtbSizeY] = -1$$

5.11 Embodiment #11

The changes, marked in bold and Italic, are based on JVET-O2001-vE. Deleted texts are marked with double brackets (e.g., [[a]] denotes the deletion of the character "a").

7.4.3.3 Sequence Parameter Set RBSP Semantics

The variables Ctb Log 2SizeY, CtbSizeY, MinCb Log 2SizeY, MinCbSizeY, IbcBufWidthY, IbcBufWidthC and Vsize are derived as follows:

$$CtbLog2SizeY = \log2\_ctu\_size\_minus5 + 5 \quad (7-15)$$

$$CtbSizeY = 1 << CtbLog2SizeY \quad (7-16)$$

$$MinCbLog2SizeY = \quad (7-17)$$
$$\log2\_min\_luma\_coding\_block\_size\_minus2 + 2$$

$$MinCbSizeY = 1 << MinCbLog2SizeY \quad (7-18)$$

$$IbcBufWidthY = [[128]]256 * 128 / CtbSizeY \quad (7-19)$$

$$IbcBufWidthC = IbcBufWidthY / SubWidthC \quad (7-20)$$

$$VSize = \text{Min}(64, CtbSizeY) \quad (7-21)$$

7.4.9.5 Coding Unit Semantics

When x0% VSize is equal to 0 and y0% VSize is equal to 0, the following assignments are made for x=x0 . . . x0+VSize−1 and y=y0 . . . y0+VSize−1:

$$IbcVirBuf[0][(x + (IbcBufWidthY >> 1))\% \ IbcBufWidthY] \quad (7\text{-}154)$$
$$[y \% CtbSizeY] = -1$$

Figure 4:
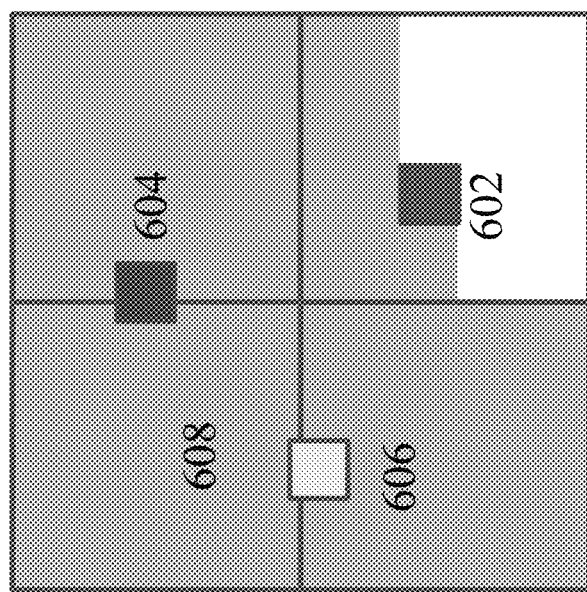
FIG. 4 shows an example, for a current CU (602), a block (604) is crossing a VPDU column reference block and a block (606) is crossing a VPDU row reference block. Each large block indicates a 64×64 VPDU and an area (608) indicated reconstrued pixels that can be used for IBC reference.

FIG. 4 shows examples of reference blocks crossing VPDU column and VPDU row. As shown in FIG. 4, for a current CU (602), a block (604) is crossing a VPDU column reference block and a block (606) is crossing a VPDU row reference block. Each large block indicates a 64×64 VPDU and an area (608) indicated reconstrued pixels that can be used for IBC reference.

Figure 5:
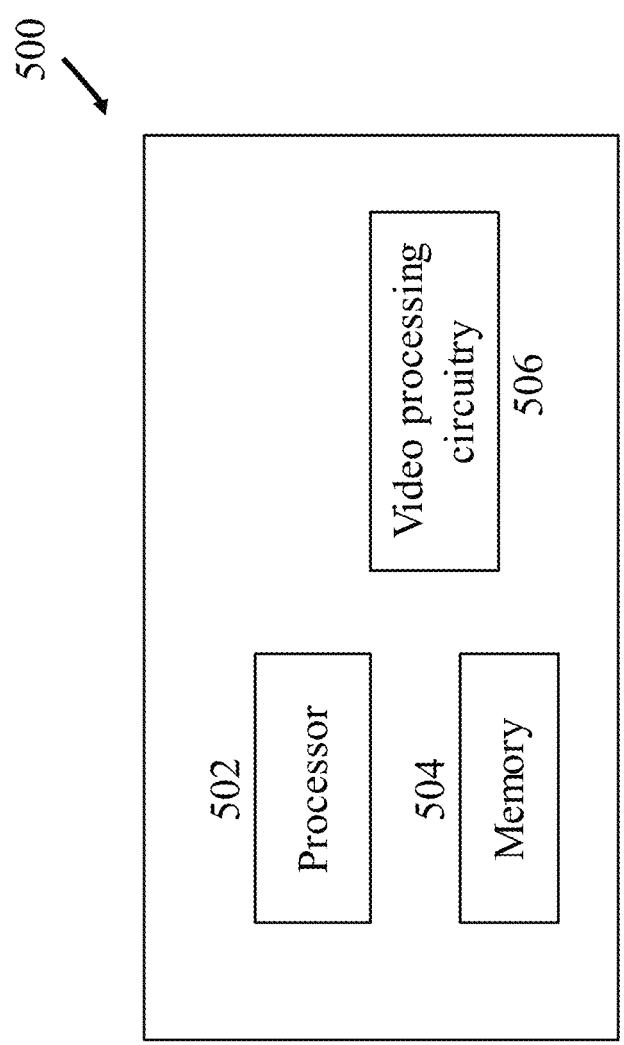
FIG. 5 is a block diagram of an example of a hardware platform for implementing a visual media decoding or a visual media encoding technique described in the present document.

FIG. 5 is a block diagram of a video processing apparatus 500. The apparatus 500 may be used to implement one or more of the methods described herein. The apparatus 500 may be embodied in a smartphone, tablet, computer, Internet of Things (IoT) receiver, and so on. The apparatus 500 may include one or more processors 502, one or more memories 504 and video processing hardware 506. The processor(s) 502 may be configured to implement one or more methods (including, but not limited to, method 400) described in the present document. The memory (memories) 504 may be used for storing data and code used for implementing the methods and techniques described herein. The video processing hardware 506 may be used to implement, in hardware circuitry, some techniques described in the present document.

Figure 6:
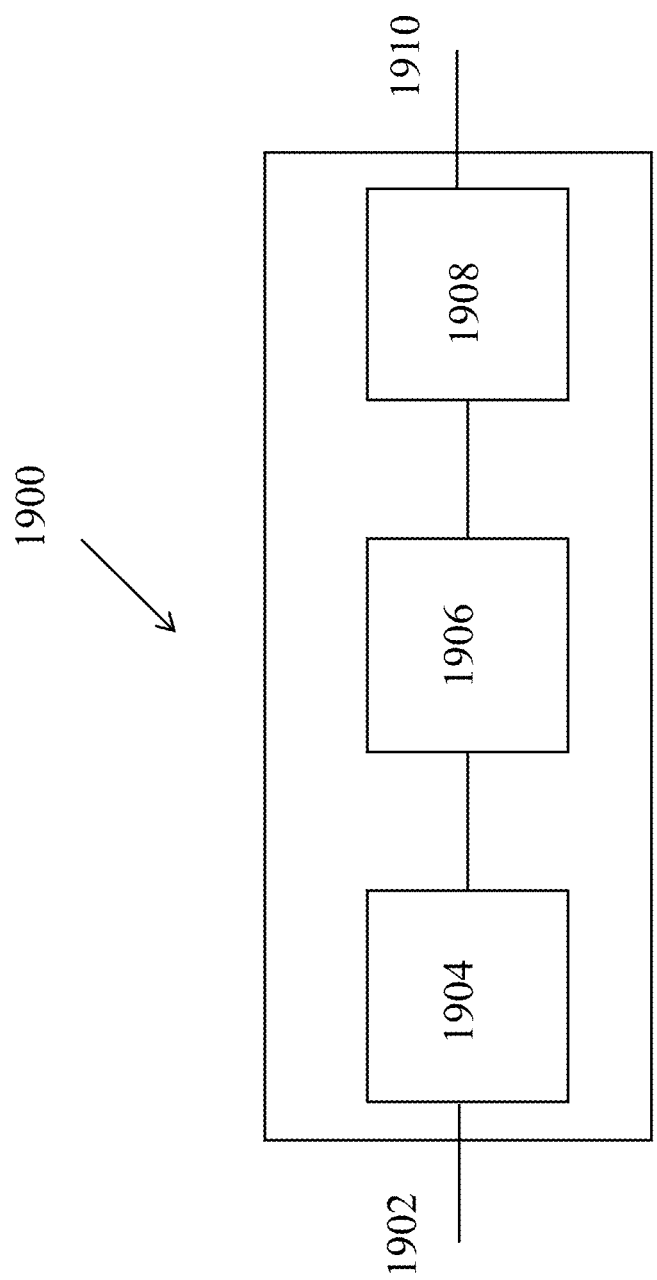
FIG. 6 is a block diagram of an example video processing system in which disclosed techniques may be implemented.

FIG. 6 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Display port, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 5 or 6.

The examples described above may be incorporated in the context of the methods described below, e.g., methods 710 to 730, which may be implemented at a video decoder or a video encoder.

FIG. 7A shows a flowchart of an exemplary method 710 for video processing. The method 710 includes, at step 712, making a decision, based on a size of a virtual buffer associated with a current block that is coded based on pixels in a reference block, regarding a validity of a block vector or one or more samples mapped to the virtual buffer, a current picture comprising the current block and the reference block, and the size of the virtual buffer being based on a size of a virtual pipeline data unit (VPDU), a size of a coding tree block (CTB) size or a size of a coding tree unit (CTU). The method 700 includes, at step 714, performing, based on the decision, a conversion between the current block and a bitstream representation of the current block.

Figure 7B:
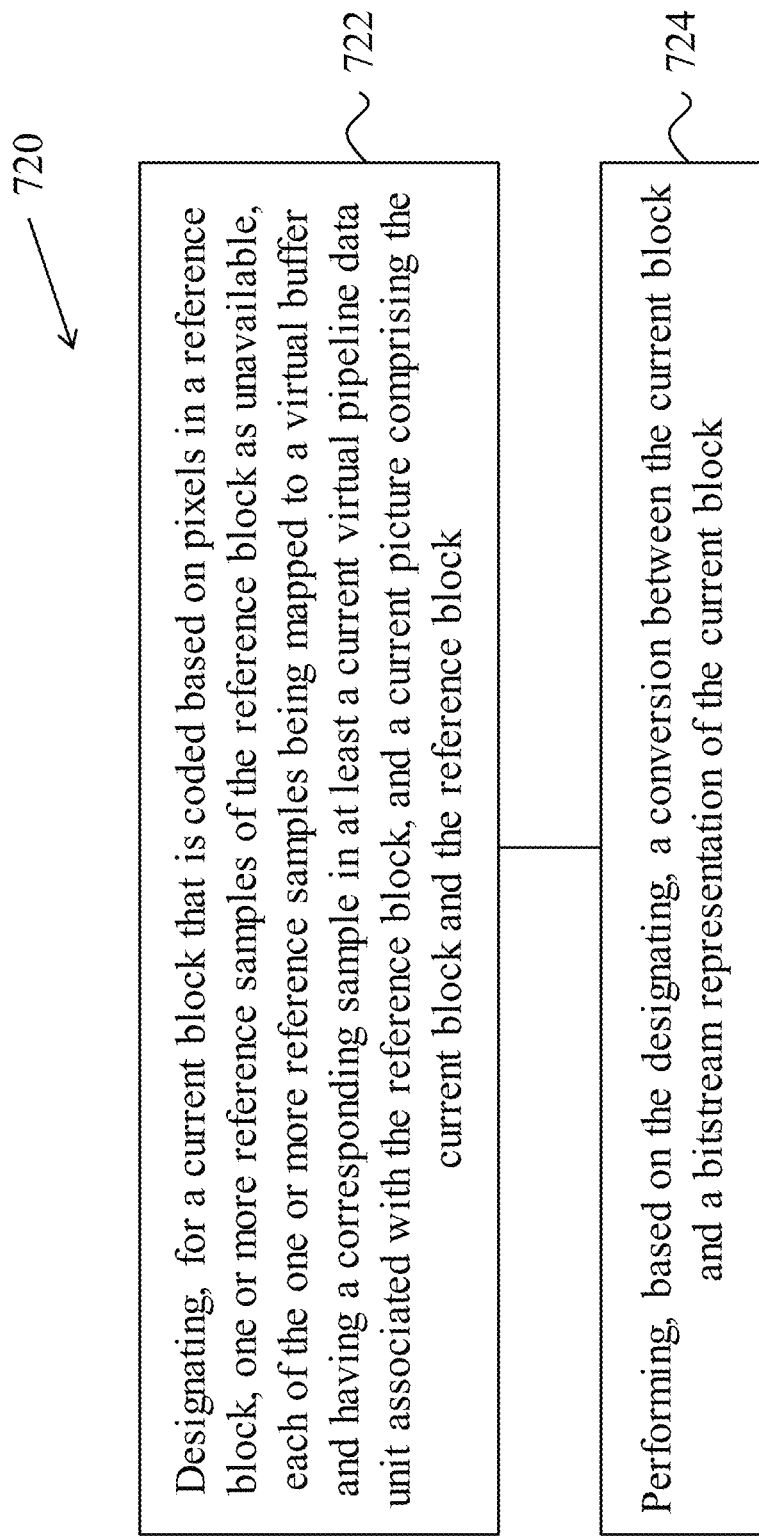

FIG. 7B shows a flowchart of an exemplary method 720 for video processing. The method 720 includes, at step 722, designating, for a current block that is coded based on pixels in a reference block, one or more reference samples of the reference block as unavailable, each of the one or more reference samples being mapped to a virtual buffer and having a corresponding sample in at least a current virtual pipeline data unit (VPDU) associated with the reference block, and a current picture comprising the current block and the reference block. The method 720 includes, at step 724, performing, based on the designating, a conversion between the current block and a bitstream representation of the current block.

Figure 7C:
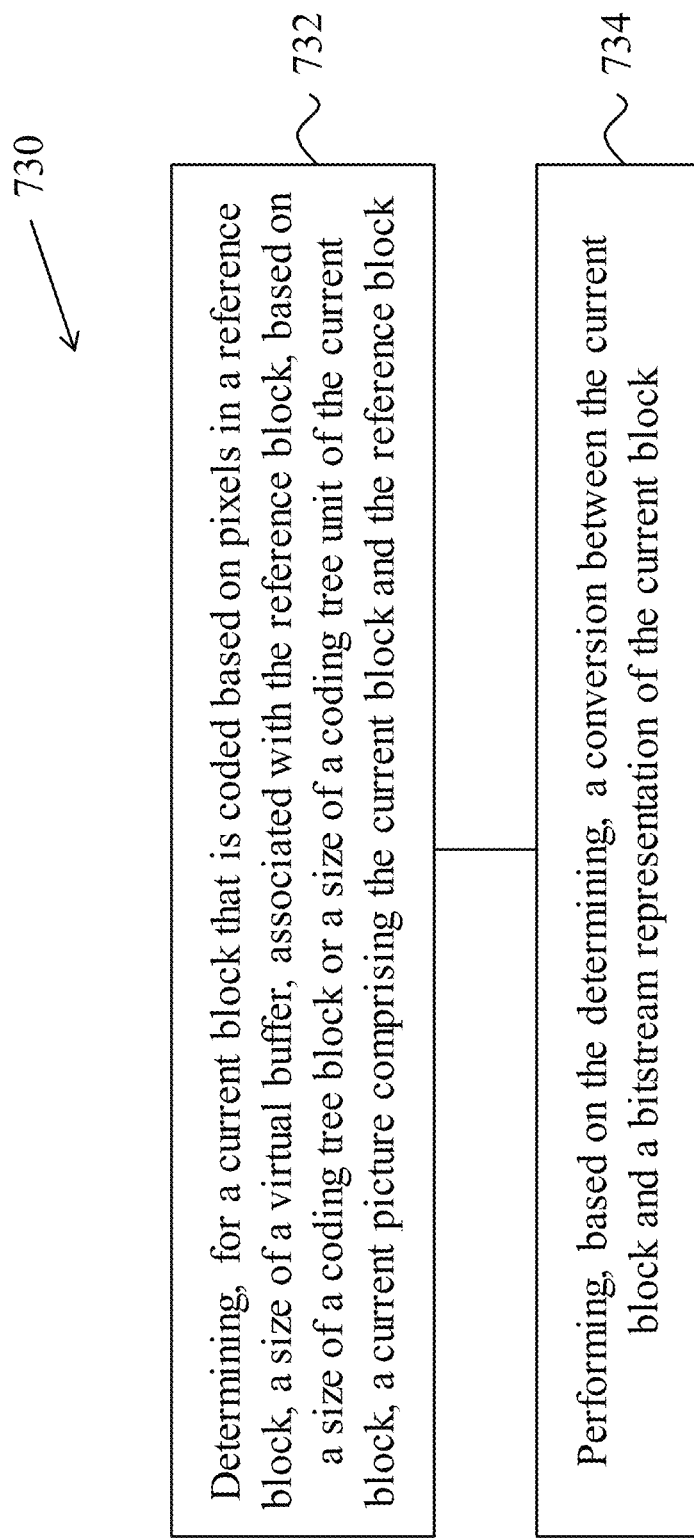

FIG. 7C shows a flowchart of an exemplary method 730 for video processing. The method 730 includes, at step 732, determining, for a current block that is coded based on pixels in a reference block, a size of a virtual buffer, associated with the reference block, based on a size of a coding tree block (CTB) or a size of a coding tree unit (CTU) of the current block, a current picture comprising the current block and the reference block. The method 730 includes, at step 734, performing, based on the determining, a conversion between the current block and a bitstream representation of the current block.

Figure 8A:
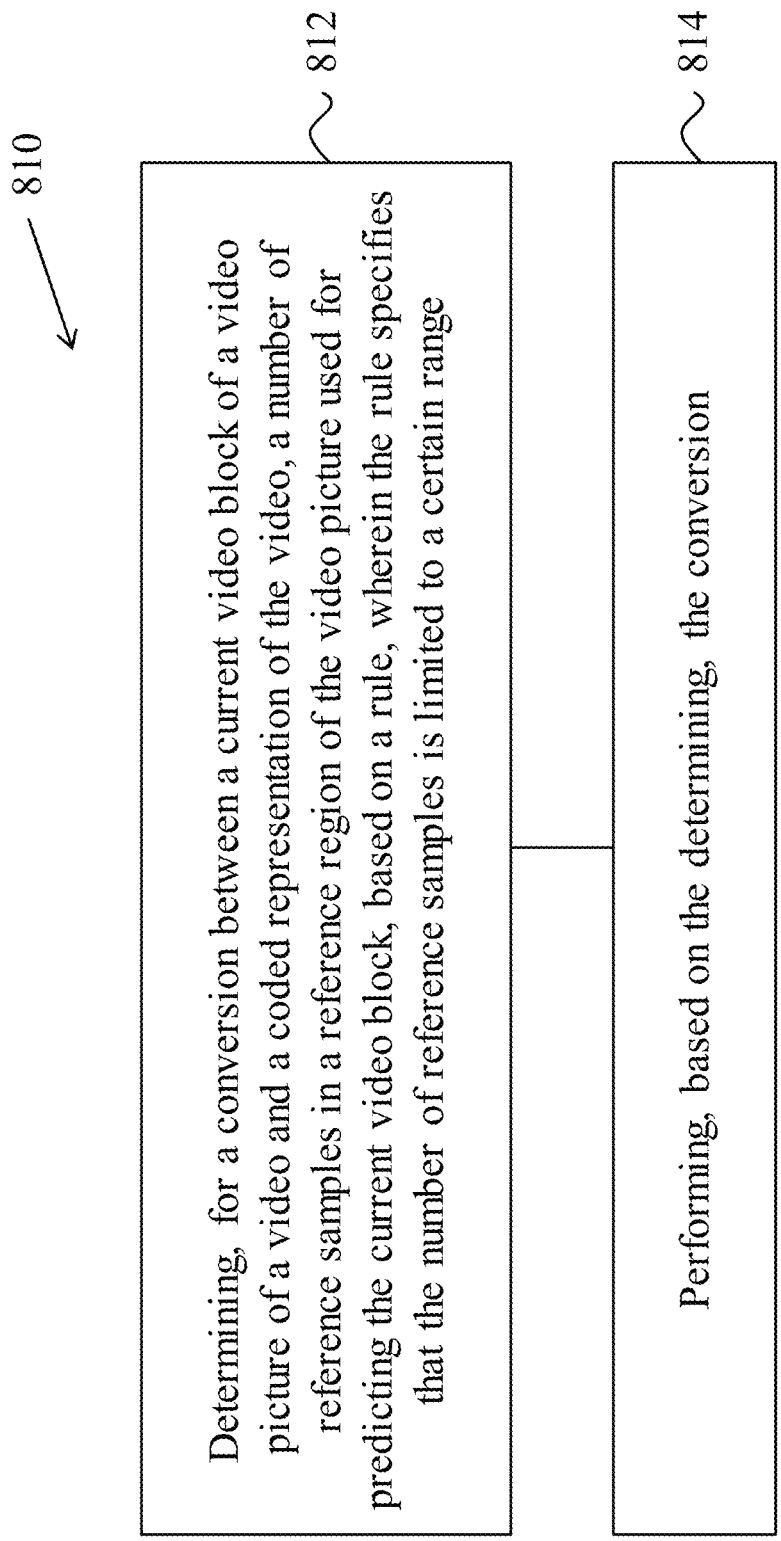
FIGS. 8A to 8D show flowcharts of example methods for video processing based on some implementations of the disclosed technology.

FIG. 8A shows a flowchart of an exemplary method 810 for video processing. The method 810 includes, at step 812, determining, for a conversion between a current video block of a video picture of a video and a coded representation of the video, a number of reference samples in a reference region of the video picture used for predicting the current video block, based on a rule, wherein the rule specifies that the number of reference samples is limited to a certain range. The method 810 includes, at step 814, performing, based on the determining, the conversion.

Figure 8B:
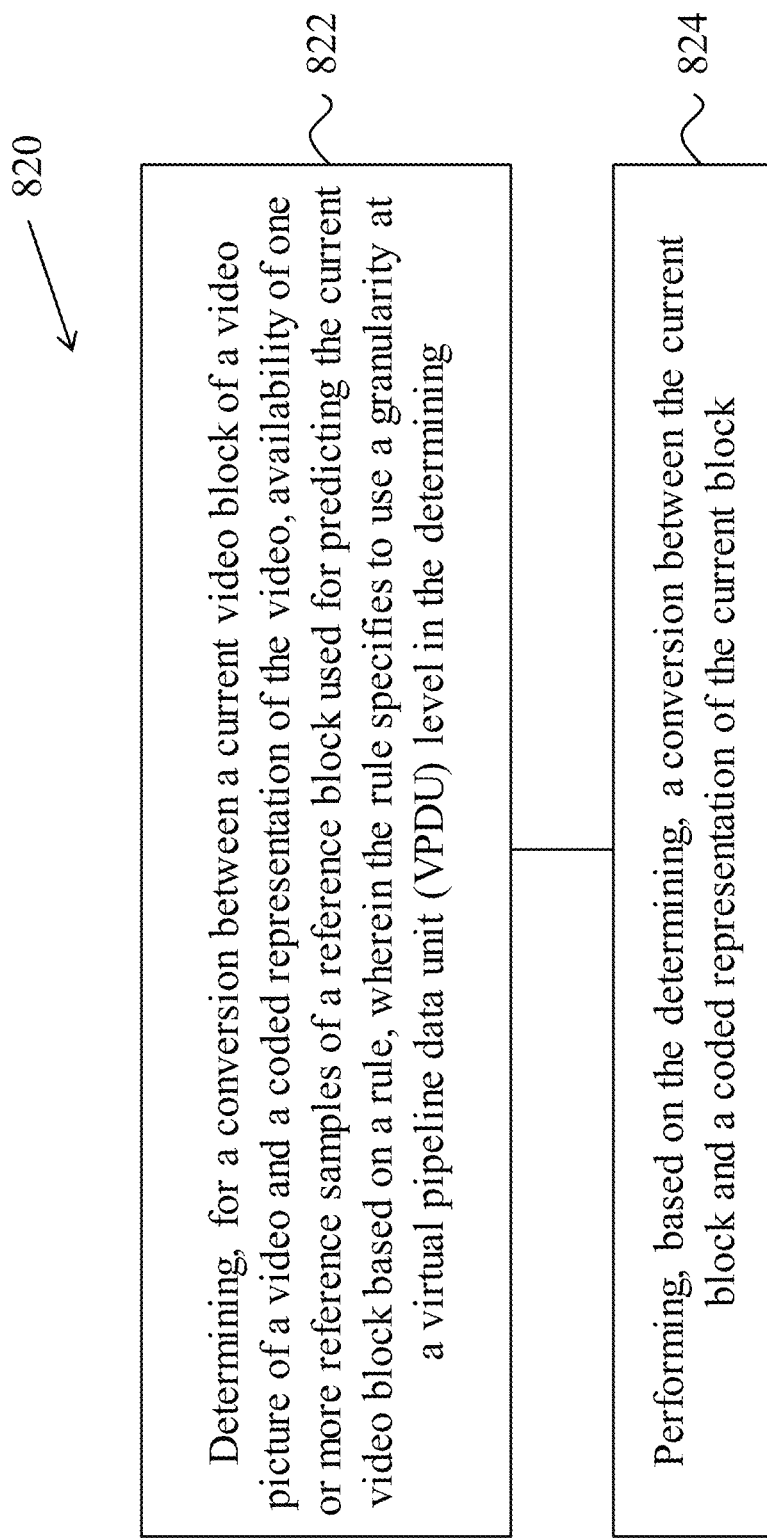

FIG. 8B shows a flowchart of an exemplary method 820 for video processing. The method 820 includes, at step 822, determining, for a conversion between a current video block of a video picture of a video and a coded representation of the video, availability of one or more reference samples of a reference block used for predicting the current video block based on a rule, wherein the rule specifies to use a granularity at a virtual pipeline data unit (VPDU) level in the determining. The method 820 includes, at step 824, performing, based on the determining, a conversion between the current block and a coded representation of the current block.

Figure 8C:
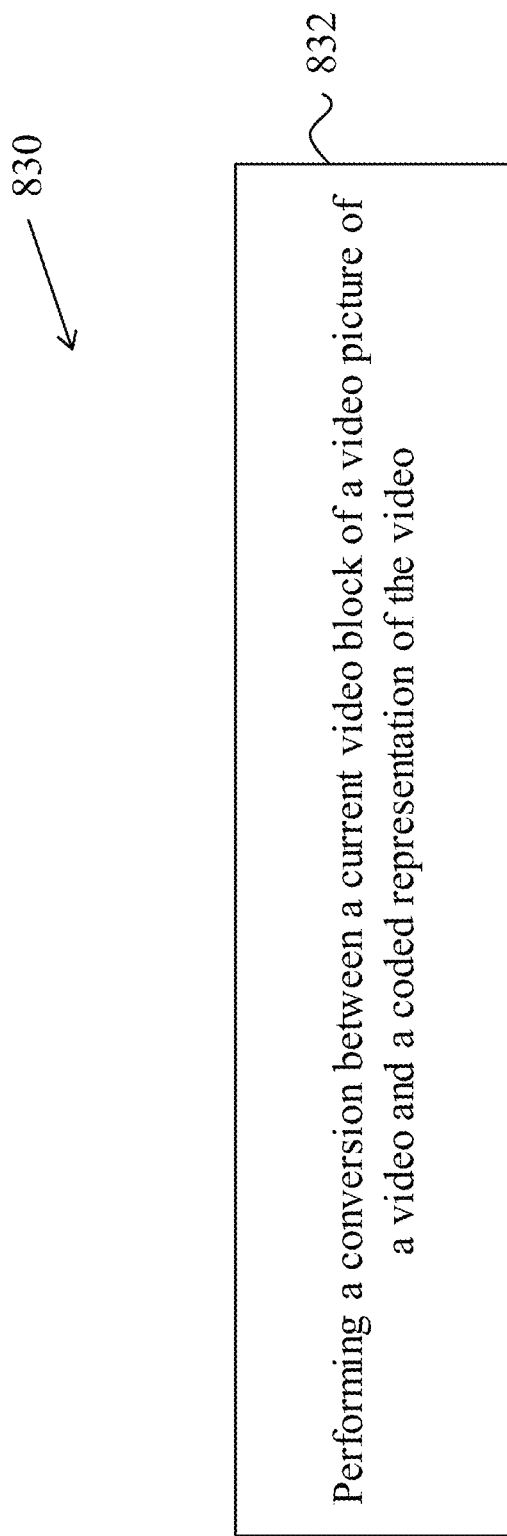

FIG. 8C shows a flowchart of an exemplary method 830 for video processing. The method 830 includes, at step 832, performing a conversion between a current video block of a video picture of a video and a coded representation of the video. In some implementations, the the conversion is performed according to a rule, wherein the current video block is represented in the coded representation using a residual of prediction from reference samples from a reference region in the video pictures, and wherein the rule specifies that sample values in the reference region are reset at beginning of processing each virtual pipeline data unit (VPDU) during the conversion based on a position of a current VPDU of the current video block. In some implementations, the conversion comprises using, a count of a number of available current virtual pipeline data units (VPDUs) that are mapped to a reference region of the video picture from which one or more reference samples are used for predicting the current video block.

Figure 8D:
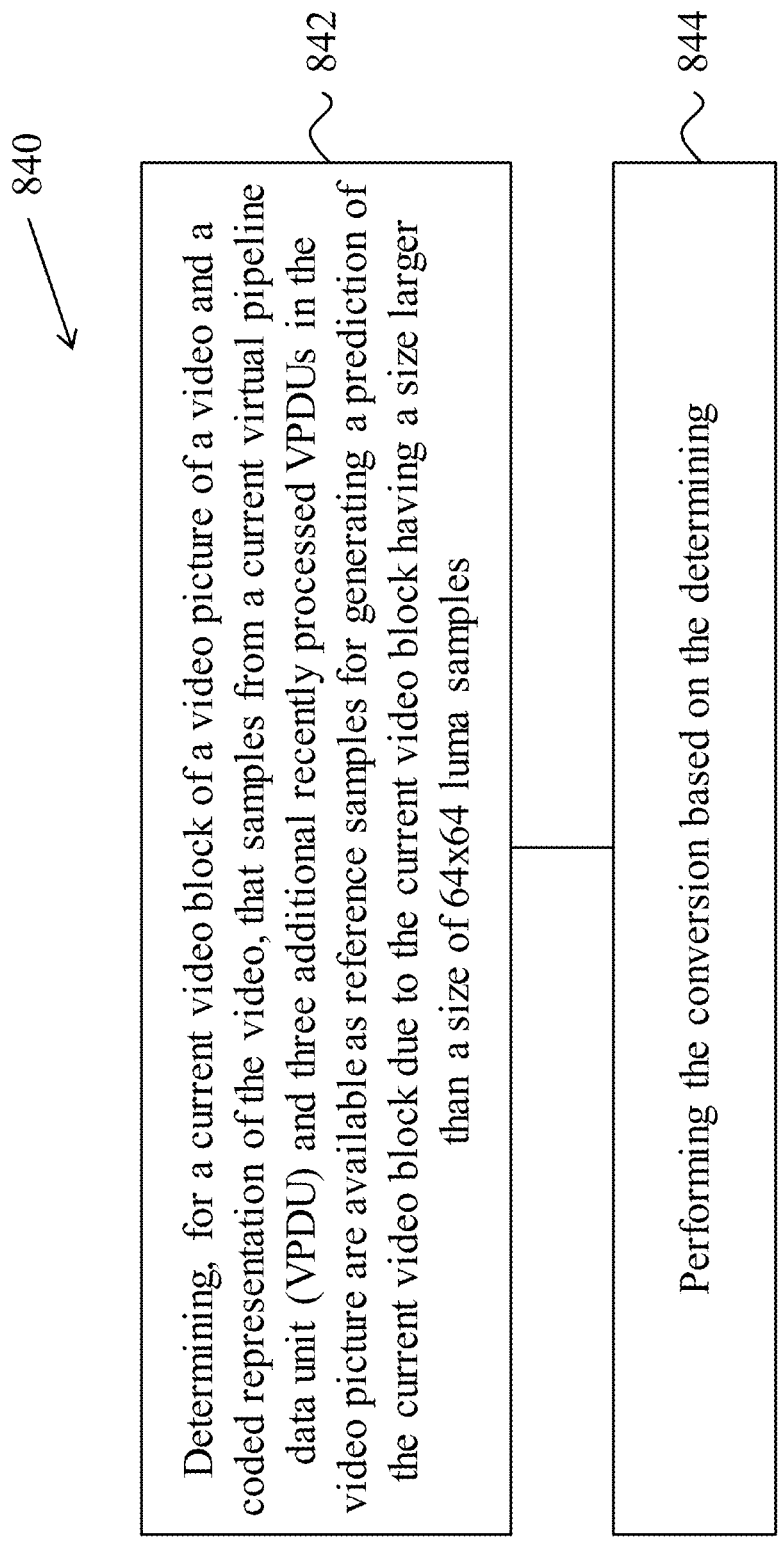

FIG. 8D shows a flowchart of an exemplary method 840 for video processing. The method 840 includes, at step 842, determining, for a current video block of a video picture of a video and a coded representation of the video, that samples from a current virtual pipeline data unit (VPDU) and three additional recently processed VPDUs in the video picture are available as reference samples for generating a prediction of the current video block due to the current video block having a size larger than a size of 64×64 luma samples. The method 840 includes, at step 844, performing the conversion based on the determining.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

Various solutions and embodiments described in the present document are further described using a list of clauses. The first set of clauses describe certain features and aspects of the disclosed techniques in the previous section.

1. A method for video processing, comprising: making a decision, based on a size of a virtual buffer associated with a current block that is coded based on pixels in a reference block, regarding a validity of a block vector or one or more samples mapped to the virtual buffer, wherein a current picture comprises the current block and the reference block, and wherein the size of the virtual buffer is based on a size of a virtual pipeline data unit (VPDU), a size of a coding tree block (CTB) size or a size of a coding tree unit (CTU); and performing, based on the decision, a conversion between the current block and a bitstream representation of the current block.

2. The method of claim 1, wherein a product of a height and a width of the virtual buffer is fixed, and wherein the height or the width is based on the size of the VPDU, the size of the CTB or the size of the CTU.

3. The method of clause 1, wherein a width of the virtual buffer is equal to a width of the CTB or a width of the CTU.

4. The method of clause 1, wherein a width or a height of the virtual buffer is N times a width or a height of the VPDU, respectively, and wherein N≥1 is an integer.

5. The method of clause 1, wherein a maximum number of the one or more samples is less than the size of the virtual buffer.

6. The method of clause 1, wherein a maximum number of the one or more samples is fixed upon a determination that the size of the CTB or the size of the CTU is larger than 64×64.

7. The method of clause 1, wherein a number of the one or more samples is less than or equal to N times a number of samples in the VPDU, and wherein N>1 is an integer.

8. The method of clause 7, wherein N=3 upon a determination that the size of the CTB or the size of the CTU is larger than 64×64.

9. A method for video processing, comprising: designating, for a current block that is coded based on pixels in a reference block, one or more reference samples of the reference block as unavailable, wherein each of the one or more reference samples is mapped to a virtual buffer and has a corresponding sample in at least a current virtual pipeline data unit (VPDU) associated with the reference block, and wherein a current picture comprises the current block and the reference block; and performing, based on the designating, a conversion between the current block and a bitstream representation of the current block.

10. The method of clause 9, further comprising: designating the corresponding sample in the current VPDU as unavailable.

11. The method of clause 10, wherein the designating the corresponding sample is based on a position of the current VPDU.

12. The method of clause 10, wherein the designating the corresponding sample is based on a position of a previous VPDU or a recently decoded VPDU.

13. The method of clause 9, wherein each of the one or more reference samples has a corresponding sample in each of three most recently decoded VPDUs.

14. A method for video processing, comprising: determining, for a current block that is coded based on pixels in a reference block, a size of a virtual buffer, associated with the reference block, based on a size of a coding tree block (CTB) or a size of a coding tree unit (CTU) of the current block, wherein a current picture comprises the current block and the reference block; and performing, based on the determining, a conversion between the current block and a bitstream representation of the current block.

15. The method of clause 14, wherein the size of the virtual buffer is 256×128 upon a determination that the size of the CTB or the CTU is 128×128.

16. The method of clause 14, wherein the size of the virtual buffer is 64×256 upon a determination that the size of the CTB or the CTU is 256×256.

17. The method of clause 14, wherein the size of the virtual buffer is 128×256 upon a determination that the size of the CTB or the CTU is 256×256.

18. The method of any of clauses 1 to 17, wherein coding the current block based on the pixels in the reference block in the current picture that comprises the current block is an intra block copy (IBC) operation, and wherein the virtual buffer is an IBC virtual buffer.

19. A method of video processing, comprising: allocating, for a conversion between a bitstream representation of a current block of video and the current block, an intra block coding (IBC) virtual buffer size that is greater than a minimum size of a block vector search area for the conversion; and performing the conversion based on the allocating.

20. The method of clause 19, wherein the IBC buffer size is larger than a total size of a virtual pipeline data unit memory used for the conversion.

21. The method of any of clauses 19-20, wherein a width of the IBC virtual buffer size is (128*128/ctbSizeY+ctbSizeY).

22. A method of video processing, comprising: determining, for a conversion between a bitstream representation of a current block of video and the current block, a size of a reference block for the conversion based on an intra block prediction coding based on a rule; and performing the conversion based on the determining; wherein the rule constrains the reference block to be within a virtual pipeline data unit (VPDU) column or a virtual pipeline data unit row.

23. The method of clause 22, wherein the rule disallows the reference block to be across different VPDU rows.

24. The method of clause 22, wherein the rule disallows the reference block to be across different VPDU columns.

25. The method of any of clauses 22-24, wherein the VPDU column or the VPDU row are relative to a picture that contains the current block.

26. The method of any of clauses 22-24, wherein the VPDU column or the VPDU row are relative to in intra block copy virtual buffer.

27. The method of any of clauses 1-26, wherein the conversion comprises video coding to generate the bitstream representation from the current block.

28. The method of any of clauses 1-26, wherein the conversion comprises video decoding to generate the current block from the bitstream representation.

29. An apparatus in a video system comprising a processor and a non-transitory memory with instructions thereon, wherein the instructions upon execution by the processor, cause the processor to implement the method in any one of clauses 1 to 28.

30. A computer program product stored on a non-transitory computer readable media, the computer program product including program code for carrying out the method in any one of clauses 1 to 28.

31. A method, apparatus or system described herein.

The second set of clauses describe certain features and aspects of the disclosed techniques in the previous section, for example, Example Items 2-5, 8, and 16.

1. A method for video processing, comprising: determining, for a conversion between a current video block of a video picture of a video and a coded representation of the video, a number of reference samples in a reference region of the video picture used for predicting the current video block, based on a rule, wherein the rule specifies that the number of reference samples is limited to a certain range; and performing, based on the determining, the conversion.

2. The method of clause 1, wherein the rule specifies that a maximum number of the reference samples is less than a size of the reference region.

3. The method of clause 1, wherein the rule specifies that a maximum number of the reference samples is fixed in a case that that a size of a coding tree block (CTB) or a size of a coding tree unit (CTU) is larger than 64×64.

4. The method of clause 1, wherein the rule specifies that the number of the reference samples is less than or equal to N times a number of samples in a virtual pipeline data unit (VPDU), and wherein N≥1 is an integer.

5. The method of clause 4, wherein N=3 in a case that a determination that a size of a coding tree block (CTB) or a size of a coding tree unit (CTU) is larger than a size of 64×64 luma samples.

6. A method for video processing, comprising: determining, for a conversion between a current video block of a video picture of a video and a coded representation of the video, availability of one or more reference samples of a reference block used for predicting the current video block based on a rule, wherein the rule specifies to use a granularity at a virtual pipeline data unit (VPDU) level in the determining; and performing, based on the determining, a conversion between the current block and a coded representation of the current block.

7. The method of clause 6, wherein the determining determines that the one or more reference samples as unavailable and wherein the method further comprises determining one or more corresponding samples in a current VPDU as unavailable.

8. The method of clause 6, further comprising: determining availability of one or more VPDUs as unavailable.

9. The method of clause 7, wherein the determining of the one or more corresponding samples is based on a position of the current VPDU.

10. The method of clause 7, wherein the determining of the one or more corresponding samples is based on a position of a previous VPDU or a recently decoded VPDU.

11. The method of clause 6, wherein the determining is performed right before encoding or decoding a video unit including the current video block and wherein the one or more reference samples correspond to a reference region of the video picture.

12. The method of clause 11, wherein, before encoding or decoding of the video unit, a corresponding area in the reference region is marked as unavailable.

13. The method of clause 11, wherein a corresponding area in the reference region corresponds to a luma area with x=(X%IBC_buf_width) . . . (X%IBC_buf_width)+W−1 and y=(Y%IBC_buf_height) . . . (Y%IBC_buf_height)+H−1, wherein the video unit has a size of W×H, IBC_buf_width and IBC_buf_height indicate a width and a height of the virtual buffer, respectively, and a top-left position of the video unit is (X, Y).

14. The method of clause 11, wherein a corresponding area in the reference region corresponds to a chroma area with x=(X%IBC_buf_width)/SubWidthC . . . ((X%IBC_buf_width)+W−1)/SubWidthC and y=(Y%IBC_buf_height)/SubHeightC . . . ((Y%IBC_buf_height)+H−1)/SubHeightC, wherein the video unit has a size of W×H, IBC_buf_width and IBC_buf_height indicate a width and a height of the virtual buffer, respectively, and a top-left position of the video unit is (X, Y).

15. The method of clause 6, wherein the determining is performed right before encoding or decoding K×L samples or K×L pixels that are included in a video unit including the current video block.

16. The method of clause 15, wherein at least one of K and L is equal to 1.

17. The method of clause 15, wherein at least one of K and L is set to a sub-block size used in the video unit.

18. A method for video processing, comprising: performing a conversion between a current video block of a video picture of a video and a coded representation of the video according to a rule, wherein the current video block is represented in the coded representation using a residual of prediction from reference samples from a reference region in the video pictures, and wherein the rule specifies that sample values in the reference region are reset at beginning of processing each virtual pipeline data unit (VPDU) during the conversion based on a position of a current VPDU of the current video block.

19. The method of clause 18, wherein the reference region is at a position of (xVPDU+ctbSizeY, yVPDU), wherein (x VPDU, yVPDU) denotes a position of the current VPDU relative to a top-left of a picture including the current video block and ctbSizeY is a width or a height of a luma coding tree block (CTB) or a luma coding tree unit (CTU).

20. A method for processing video, comprising: determining, for a current video block of a video picture of a video and a coded representation of the video, that samples from a current virtual pipeline data unit (VPDU) and three additional recently processed VPDUs in the video picture are available as reference samples for generating a prediction of the current video block due to the current video block having a size larger than a size of 64×64 luma samples; and performing the conversion based on the determining.

21. The method of clause 20, wherein the current video block corresponds to a coding tree block (CTB) or a coding tree unit (CTU).

22. The method of clause 20, wherein an index is maintained for each VPDU mapped to a reference region of the video picture.

23. A method for video processing, comprising: performing a conversion between a current video block of a video picture of a video and a coded representation of the video, and wherein, the conversion comprises using, a count of a number of available current virtual pipeline data units (VPDUs) that are mapped to a reference region of the video picture from which one or more reference samples are used for predicting the current video block.

24. The method of clause 23, wherein the counter is reset to zero at beginning of decoding each CTU row and increased by one at decoding a VPDU mapped to the reference region.

25. The method of clause 23, wherein the counter is larger than a certain value and wherein samples in a VPDU mapped to the reference region are marked as unavailable and the counter is decreased by one.

26. The method of any of clauses 1 to 25, wherein the conversion includes encoding the current video block into the coded representation.

27. The method of any of clauses 1 to 25, wherein the conversion includes decoding the coded representation from the current video block.

28. A video processing apparatus comprising a processor configured to implement a method recited in any one or more of clauses 1 to 27.

29. A computer readable medium storing program code that, when executed, causes a processor to implement a method recited in any one or more of clauses 1 to 27.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:
1. A method of processing video data, comprising:
determining, for a conversion between a current video block of a video picture of a video and a bitstream of the video, a number of reference samples in a virtual buffer comprising reference samples derived from the video picture based on a rule, wherein the rule specifies that a maximum number of available reference samples in the virtual buffer is less than a size of the virtual buffer; and performing the conversion based on the determining, wherein the current video block is coded in a prediction mode in which prediction samples are derived from blocks of the available reference samples in the virtual buffer based on a block vector, wherein the rule specifies that a reference sample marked unavailable has a location of (m, n) in the virtual unit, wherein m=(x+(IbcBufWidthY>>1)) % IbcBufWidthY, and n=y % CtbSizeY, where (x, y) denotes a location of a sample in the video picture and is determined based on a size of the virtual unit, where IbcBufWidthY denotes a width of the virtual buffer, where CtbSizeY denotes a size of a luma CTB comprising the current video block, and where >> denotes right shift operator and % denotes modulo operator.

2. The method of claim 1, wherein the prediction mode is an intra block copy (IBC) mode and the virtual buffer is an IBC virtual buffer.

3. The method of claim 1, wherein IbcVirBuf[0][(x+(IbcBufWidthY>>1)) % IbcBufWidthY][y % CtbSizeY]=−1, where IbcVirBuf[0][m][n] denotes the reference sample marked unavailable in the virtual buffer.

4. The method of claim 1, wherein at beginning of decoding each CTU row, values of references samples in the virtual buffer are reset to −1.

5. The method of claim 1, wherein a product of a height and a width of the virtual buffer is fixed, and the width of the virtual buffer is determined based on the size of the CTB.

6. The method of claim 5, wherein the height of the virtual buffer is equal to a height of the CTB, and the width of the virtual buffer is set to a value obtained by dividing an area of the virtual buffer by the height of the CTB.

7. The method of claim 6, wherein the area of the virtual buffer is 256*128, the height of the virtual buffer is equal to ctbSizeY, and the width of the virtual buffer is 256*128/ctbSizeY, where ctbSizeY denotes a size of a luma CTB comprising the current video block.

8. The method of claim 1, wherein the conversion includes encoding the current video block into the bitstream.

9. The method of claim 1, wherein the conversion includes decoding the current video block from the bitstream.

10. The method of claim 1, wherein the height of the virtual unit is min (Ctb Size, 64), where Ctb Size denotes a size of a CTB comprising the current video block.

11. An apparatus for processing video data comprising a processor and a non-transitory memory with instructions thereon, wherein the instructions upon execution by the processor, cause the processor to:

determine, for a conversion between a current video block of a video picture of a video and a bitstream of the video, a number of reference samples in a virtual buffer comprising reference samples derived from the video picture based on a rule, wherein the rule specifies that a maximum number of available reference samples in the virtual buffer is less than a size of the virtual buffer; and perform the conversion based on the determining, wherein the current video block is coded in a prediction mode in which prediction samples are derived from blocks of the available reference samples in the virtual buffer based on a block vector, wherein the rule specifies that a reference sample marked unavailable has a location of (m, n) in the virtual unit, wherein m=(x+(IbcBufWidthY>>1)) % IbcBufWidthY, and n=y % CtbSizeY, where (x, y) denotes a location of a sample in the video picture and is determined based on a size of the virtual unit, where IbcBufWidthY denotes a width of the virtual buffer, where CtbSizeY denotes a size of a luma CTB comprising the current video block, and where >> denotes right shift operator and % denotes modulo operator.

12. The apparatus of claim 11, wherein the prediction mode is an intra block copy (IBC) mode and the virtual buffer is an IBC virtual buffer.

13. The apparatus of claim 11, wherein the height of the virtual unit is min (Ctb Size, 64), where Ctb Size denotes a size of a CTB comprising the current video block.

14. The apparatus of claim 11, wherein IbcVirBuf[0][(x0+(IbcBufWidthY>>1)) % IbcBufWidthY][y0% CtbSizeY]=−1, where IbcVirBuf[0][m][n] denotes the reference sample marked unavailable in the virtual buffer.

15. A non-transitory computer-readable storage medium storing instructions that cause a processor to:

determine, for a conversion between a current video block of a video picture of a video and a bitstream of the video, a number of reference samples in a virtual buffer comprising reference samples derived from the video picture based on a rule, wherein the rule specifies that a maximum number of available reference samples in the virtual buffer is less than a size of the virtual buffer; and perform the conversion based on the determining, wherein the current video block is coded in a prediction mode in which prediction samples are derived from blocks of the available reference samples in the virtual buffer based on a block vector, wherein the rule specifies that a reference sample marked unavailable has a location of (m, n) in the virtual unit, wherein m=(x+(IbcBufWidthY>>1)) % IbcBufWidthY, and n=y % CtbSizeY, where (x, y) denotes a location of a sample in the video picture and is determined based on a size of the virtual unit, where IbcBufWidthY denotes a width of the virtual buffer, where CtbSizeY denotes a size of a luma CTB comprising the current video block, and where >> denotes right shift operator and % denotes modulo operator.

16. The non-transitory computer-readable storage medium of claim 15, wherein the prediction mode is an intra block copy (IBC) mode and the virtual buffer is an IBC virtual buffer.

17. A non-transitory computer-readable recording medium storing a bitstream of a video which is generated by a method performed by a video processing apparatus, wherein the method comprises:

determining, for a current video block of a video picture of a video, a number of reference samples in a virtual buffer comprising reference samples derived from the video picture based on a rule, wherein the rule specifies that a maximum number of available reference samples in the virtual buffer is less than a size of the virtual buffer; and generating the bitstream based on the determining, wherein the current video block is coded in a prediction mode in which prediction samples are derived from blocks of the available reference samples in the virtual buffer based on a block vector, wherein the rule specifies that a reference sample marked unavailable has a location of (m, n) in the virtual unit, wherein m=(x+(IbcBufWidthY>>1)) % IbcBufWidthY, and n=y % CtbSizeY, where (x, y) denotes a location of a sample in the video picture and is determined based on a size of the virtual unit, where IbcBufWidthY denotes a width of the virtual buffer, where CtbSizeY denotes a size of a luma CTB comprising the current video block, and where >> denotes right shift operator and % denotes modulo operator.

18. The non-transitory computer-readable recording medium of claim 17, wherein the prediction mode is an intra block copy (IBC) mode and the virtual buffer is an IBC virtual buffer.

* * * * *